(12) United States Patent
Moriarty

(10) Patent No.: US 8,671,684 B2
(45) Date of Patent: Mar. 18, 2014

(54) PARTIALLY SELF-REFUELING ZERO EMISSIONS SYSTEM

(75) Inventor: Donald Moriarty, Provo, UT (US)

(73) Assignee: Donald E. Moriarty, Provo, UT (US)

( * ) Notice: Subject to any disclaimer, the term of this patent is extended or adjusted under 35 U.S.C. 154(b) by 748 days.

(21) Appl. No.: 12/425,264

(22) Filed: Apr. 16, 2009

(65) Prior Publication Data

US 2009/0260363 A1    Oct. 22, 2009

Related U.S. Application Data

(60) Provisional application No. 61/124,469, filed on Apr. 16, 2008.

(51) Int. Cl.
*F01K 23/10* (2006.01)
*F02G 3/00* (2006.01)
*F02B 43/08* (2006.01)
*H02K 7/02* (2006.01)

(52) U.S. Cl.
USPC ...................... 60/618; 60/616; 123/3; 310/74

(58) Field of Classification Search
USPC ................ 60/616–624, 641.8–641.15; 123/3; 136/200–241; 180/65.51; 310/74, 75 R; 290/1 R; 322/3
See application file for complete search history.

(56) References Cited

U.S. PATENT DOCUMENTS

| | | | |
|---|---|---|---|
| 583,104 A | 5/1897 | Wattles | |
| 2,365,330 A | 12/1944 | Carmichael | |
| 2,496,623 A | 2/1950 | Fragale | |
| 3,101,592 A * | 8/1963 | Robertson et al. | .......... 60/39.463 |
| 3,239,678 A | 3/1966 | Kolm et al. | |
| 3,471,274 A | 10/1969 | Quigley et al. | |
| 3,608,660 A * | 9/1971 | Smith et al. | .................. 180/69.5 |
| 3,648,668 A | 3/1972 | Pacheco | |
| 3,995,421 A | 12/1976 | Kuroiwa | |
| 4,009,006 A | 2/1977 | Hreha | |
| 4,023,545 A | 5/1977 | Mosher et al. | |
| 4,085,709 A | 4/1978 | Tangri | |
| 4,099,489 A * | 7/1978 | Bradley | ........................... 123/3 |
| 4,112,875 A | 9/1978 | Fletcher et al. | |

(Continued)

FOREIGN PATENT DOCUMENTS

| | | |
|---|---|---|
| EP | 0755088 | 1/1997 |
| EP | 0855784 | 7/1998 |

(Continued)

OTHER PUBLICATIONS

Moriarty, U.S. Appl. No. 12/604,293, filed Oct. 22, 2009.

*Primary Examiner* — Christopher Jetton

(74) *Attorney, Agent, or Firm* — Thorpe North & Western LLP

(57) ABSTRACT

A method and device to optimize the cumulative beneficial effect of harvesting all available forms of lost energy, including energy that is lost while a vehicle is in motion (e.g., kinetic, inertia, friction, thermodynamic, and aerodynamic losses). The cumulative energy that is recovered is converted to electrical energy which powers the on-board electrolyzer to produce more hydrogen and oxygen while the system is in operation and stationary. Stationary, passive means of energy, solar, wind, hydro, etc. will also be available to power the electrolyzer. The system also contemplates utilizing passive means of energy to power a non-mobile system which incorporates an internal or external combustion engine in place of a fuel cell.

16 Claims, 13 Drawing Sheets

(56) References Cited

U.S. PATENT DOCUMENTS

| | | | |
|---|---|---|---|
| 4,256,060 A * | 3/1981 | Kelly | 123/3 |
| 4,368,696 A * | 1/1983 | Reinhardt | 123/3 |
| 4,405,872 A * | 9/1983 | Thomas | 310/75 R |
| 4,442,801 A | 4/1984 | Glynn et al. | |
| 4,475,075 A | 10/1984 | Munn | |
| 4,536,674 A | 8/1985 | Schmidt | |
| 4,539,496 A | 9/1985 | Thomas et al. | |
| 4,761,577 A | 8/1988 | Thomas et al. | |
| 4,775,919 A | 10/1988 | Pearsall et al. | |
| 4,841,731 A * | 6/1989 | Tindell | 60/641.8 |
| 4,893,877 A | 1/1990 | Powell et al. | |
| 5,063,881 A | 11/1991 | Kawamura | |
| 5,143,025 A | 9/1992 | Munday | |
| 5,231,954 A | 8/1993 | Stowe | |
| 5,280,827 A | 1/1994 | Taylor et al. | |
| 5,337,560 A | 8/1994 | Abdelmalek | |
| 5,346,778 A * | 9/1994 | Ewan et al. | 429/415 |
| 5,400,746 A | 3/1995 | Susa et al. | |
| 5,603,290 A | 2/1997 | Swain et al. | |
| 5,631,507 A | 5/1997 | Bajric et al. | |
| 5,828,135 A | 10/1998 | Barrett | |
| 6,037,690 A | 3/2000 | Hill | |
| 6,111,375 A | 8/2000 | Zenobi | |
| 6,116,763 A | 9/2000 | King | |
| 6,138,781 A | 10/2000 | Hakala | |
| 6,257,175 B1 | 7/2001 | Mosher et al. | |
| 6,291,901 B1 * | 9/2001 | Cefo | 290/1 R |
| 6,305,442 B1 | 10/2001 | Ovshinsky et al. | |
| 6,311,648 B1 | 11/2001 | Larocque | |
| 6,314,732 B1 * | 11/2001 | Lookholder | 60/597 |
| 6,336,430 B2 | 1/2002 | De Souza et al. | |
| 6,382,820 B1 | 5/2002 | Chung | |
| 6,423,894 B1 | 7/2002 | Patz et al. | |
| 6,725,713 B2 * | 4/2004 | Adamson et al. | 73/146.5 |
| 6,857,397 B2 | 2/2005 | Zagaja et al. | |
| 6,887,601 B2 | 5/2005 | Moulthrop | |
| 6,920,951 B2 * | 7/2005 | Song et al. | 180/165 |
| 6,935,263 B1 | 8/2005 | Bandyopadhyay | |
| 7,000,395 B2 | 2/2006 | Wai et al. | |
| 7,028,675 B2 | 4/2006 | Bushnell et al. | |
| 7,043,918 B1 * | 5/2006 | Lee | 60/649 |
| 7,100,542 B2 | 9/2006 | Ehresman | |
| 7,147,069 B2 | 12/2006 | Maberry | |
| 7,191,737 B2 * | 3/2007 | Klein | 123/3 |
| 7,240,641 B2 | 7/2007 | Balan et al. | |
| 7,654,233 B2 | 2/2010 | Lin | |
| 7,753,010 B2 * | 7/2010 | Rutledge | 123/3 |
| 2002/0025457 A1 | 2/2002 | Dodd et al. | |
| 2002/0117124 A1 | 8/2002 | McMaster et al. | |
| 2004/0025807 A1 | 2/2004 | Jhetham | |
| 2004/0089486 A1 | 5/2004 | Harrup et al. | |
| 2004/0238237 A1 | 12/2004 | Tomoyasu | |
| 2005/0044853 A1 | 3/2005 | Yoshino | |
| 2005/0126515 A1 | 6/2005 | Balan et al. | |
| 2005/0228553 A1 | 10/2005 | Tryon | |
| 2006/0065214 A1 | 3/2006 | Flessner et al. | |
| 2006/0174965 A1 | 8/2006 | Hobbs | |
| 2006/0213697 A1 | 9/2006 | Sutherland | |
| 2006/0243501 A1 | 11/2006 | Hidaka | |
| 2006/0260562 A1 | 11/2006 | Otterstrom et al. | |
| 2006/0272863 A1 | 12/2006 | Donahue | |
| 2006/0278445 A1 | 12/2006 | Chang | |
| 2007/0022977 A1 | 2/2007 | Crower | |
| 2007/0074680 A1 | 4/2007 | Ross | |
| 2007/0079611 A1 * | 4/2007 | Doland | 60/495 |
| 2007/0209608 A1 * | 9/2007 | Rutledge | 123/3 |

FOREIGN PATENT DOCUMENTS

| | | |
|---|---|---|
| JP | 06-257457 | 9/1994 |
| JP | 10-299576 | 11/1998 |
| JP | 11-257206 | 9/1999 |
| JP | 11-262101 | 9/1999 |
| JP | 2004-187429 | 7/2004 |
| JP | 2005-304161 | 10/2005 |
| KR | 10-1998-065626 | 10/1998 |
| WO | WO 2004-049479 | 6/2004 |

* cited by examiner

PARTIALLY SELF-REFUELING ZERO EMISSIONS SYSTEM

PRIORITY

This application claims priority to U.S. Provisional Patent Application No. 61/124,469 filed Apr. 16, 2008 and is incorporated herein by reference in its entirety.

FIELD OF INVENTION

The present invention relates to clean air engine systems, more particularly to clean air engine systems using water by electrolysis to generate the gases to fuel an internal or external engine, fuel cell or other device.

BACKGROUND OF THE INVENTION

Global warming has mandated a multitude of domestic federal and state regulations and international treaties all designed to limit the harmful effects related to the combustion of fossil fuels. These regulations generally target $CO_2$ emissions, which have been acknowledged by some as contributing to atmospheric greenhouse heating.

Over the past few decades different countries have experienced interruptions in the availability of fossil fuel supplies due to an external oil embargo and domestic natural disasters. In addition, countries face the lingering threat of direct energy terrorism targeted at our petroleum refineries and related infrastructure. Indirect threats also exist in the form of political/terrorist blackmail which may cut off access to any non-domestic source of oil supplies without warning. For example, the current rate of crude oil consumption in the United States is calculated to be approximately 12 million barrels per day. If an emergency forced the U.S. to become solely dependent on the United States Department of Energy Strategic Petroleum Reserve, (as of February 2008 the capacity was 698.6 million barrels) this national backup would be depleted in approximately 57 days. Obviously, such a scenario doesn't take into account the probability of fuel rationing nor the petroleum output of Canada and Mexico. It does, however, highlight the United States' acute vulnerability.

Finally, some studies suggest that within 10 to 15 years the worldwide supply of crude oil deposits may be reaching the point of peak production, known as the Hubbert Point, after which supplies will steadily diminish followed by an ever-increasing cost to the consumer. The rise of crude oil prices from early 2008 to September 2008 proved to be burdensome for businesses and consumers worldwide. These prices may be mere hints of what will unfold when real crude shortages begin.

Clearly, the issues described above suggest that continued dependency on fossil fuels is a tenuous course. As a consequence, a number of non-fossil fuel based alternative fuels are being evaluated and tested for transportation including ethanol, bio-diesel, electric, and hydrogen to name a few.

Some manufacturers are pursuing electric and hybrid-electric vehicle alternatives. However, it has been suggested that a major drawback with increasing the number of electric and hybrid-electric vehicles in use is the large quantities of batteries to power the electric motors and other electrical devices. These vehicles use batteries of one kind or another (i.e., lead acid, lithium-ion, etc.) to store an electrical charge. If improperly charged, batteries can be permanently damaged. Additionally, if left uncharged for long periods of time, the batteries can sulfate or become unusable. Moreover, battery storage is heavy, space consuming, offers maintenance challenges and offers limited life. Batteries used typically for vehicles of the state-of-art have an average effective life of 8 to 10 years and must be disposed of after their lifecycle, thereby creating a daunting environmental hazard. Studies reveal that 20 percent of car batteries are discarded in land fills.

Typical combustion engines are fueled by hydrocarbons. These combustion engines are generally used to power vehicles directly or are used to drive electric generators that provide power to electric drive motors. These engines have a standard efficiency of approximately 33 percent when fossil-fueled, and create pollutants such as carbon dioxide ($CO_2$), carbon monoxide (CO), nitrous oxide and dioxide (NOx), and unburned hydrocarbons from combustion. Typically, aside from the estimated third of fuel energy converted to mechanical energy, another third is manifested into heat energy and the remaining third is expended into exhaust gas energy. By comparison, diesel engines are more efficient than gas engines, at approximately 40 percent. The addition of turbo-charging and/or supercharging also increases efficiency. Fuel cell efficiency ranges from an estimated 50 to 60 percent.

Hydrogen as a combustible fuel source creates no carbon-based emissions. Although conventional piston-type internal combustion engines can be modified to accept hydrogen fuel, the drawbacks are hydrogen pre-ignition and high levels of NOx emissions. Pre-ignition problems arise from hydrogen's low ignition energy, wide flammability range, and short quenching distance. The elevated NOx emissions are a result of mixing hydrogen with atmospheric air, which consists of approximately 78 percent nitrogen. The typical cause of elevated NOx numbers is a high compression ratio which is commonly used in hydrogen-fueled internal combustion engines to increase horsepower. NOx production in the combustion chamber can also be attributed to variables such as the air/fuel ratio, engine speed, ignition timing, and the presence of thermal dilution.

Hydrogen engines can combust hydrogen which is drawn from pressurized storage tanks. These pressurized storage tanks are filled directly with hydrogen much like current vehicles are filled at a gas station. Fuel cell vehicles, also presently under prototype development and early market testing, call for similar fueling techniques. Hydrogen filling stations will be but a piece of a huge hydrogen infrastructure dedicated to hydrogen creation, shipping, storage and delivery. Such a hydrogen economy will necessitate a monumental public and private sector investment. Also critical are the dissemination of industry standards for fueling devices and safety regulations that include mandated training to ensure proper handling of this unique fuel.

Hydrogen as a combustible fuel source may be stored in liquid form in a super-cooled liquid state or in the lattice of a metal hydride. The cryogenic system required to maintain the liquefaction is minus 253 degrees Celsius for hydrogen. The benefit of this approach is an estimated 10 fold increase in energy density (over compressed gaseous form) for both the fuel and the oxidizer. The liquefaction of hydrogen improves the energy density to within 20 percent of that of gasoline. The drawback of this method is the higher energy required 24/7 to maintain the refrigeration system versus the energy necessary to compress the gases in the low pressure (0 to 1,500 psi) and high pressure (1,500 to 10,000 plus psi) tanks. While compressing the gas draws energy during filling the tanks and compression can be stabilized without additional energy, refrigeration requires a continuous energy output to preserve the temperature sensitive cryogenic state. In the event of a refrigeration system failure, the liquids innately revert back to a gaseous state which would require tanks of sufficient size to contain the gases. If the tank size is inadequate, then the rapid expansion from a liquid to gaseous state will likely result in a tank rupture and possibly an explosion.

The option of storing the hydrogen as a solid in a metal hydride compound, nano-suspension or other solid form has drawbacks as well. The practicality of storing oxygen in this form, as it applies to the present invention, is unknown. In order to access the hydrogen stored as a solid, heat energy is required to stimulate the release of the hydrogen from its metal hydride compound, nano-suspension, or other solid state. Furthermore, as the hydrogen harvest nears depletion, it becomes more difficult to collect. The environmental impact of metal hydride disposal may be addressed by removing the hydride from the metal container and disposing of each separately. The storage of hydrogen in nano-tubes is, at this point, an unknown technology in terms of reliability, risks human and environmental poisoning, and after use, disposal pollution particularly to underground water tables.

One ideal solution to the shortage in fossil fuel supplies includes a domestic energy source that has zero harmful emissions. Because of the vast demand for energy, such an energy source must be available in sufficient volume to meet the needs of the socio-economic marketplace. It should be derived from a source that is renewable in the most environmentally responsible fashion. That is, if possible, the cycle from production to disposal will be pollution free and non-toxic. Perhaps most importantly, as certain countries increase their development of solar and wind power flowing through an improved energy grid, these advances will actually reduce the consumer's cost of this new energy. As the present invention indicates, a strong contender for this energy source may be common water. It is the most plentiful substance on earth and is inherently non-toxic.

SUMMARY OF THE INVENTION

In light of the problems and deficiencies inherent in the prior art, the present invention seeks to overcome these by providing a method and device to optimize the cumulative beneficial effect of harvesting all available forms of lost energy, including energy that is lost while a vehicle is in motion (e.g., kinetic, inertia, friction, theromodynamic, and aerodynamic losses). The cumulative energy that is recovered is converted to electrical energy which powers the on-board electrolyzer to produce more hydrogen and oxygen while the system is in operation and stationary. While stationary, passive means of energy, solar, wind, hydro, etc. will also be available to power the electrolyzer. The system also contemplates utilizing passive means of energy to power a non-mobile system which incorporates an internal or external combustion engine in place of a fuel cell.

In accordance with the invention as embodied and broadly described herein, the present invention resides in a method for powering a mobile vehicle, comprising the steps of separating a volume of water into hydrogen and oxygen components, powering an engine with the hydrogen and oxygen components, mobilizing the automobile with power generated from the engine, converting motion from the mobile vehicle to electrical energy, transmitting the electrical energy to an energy system control, and transmitting a portion of the electrical energy from the energy control system to a device for separating a volume of water into hydrogen and oxygen components.

In accordance with an additional embodiment of the invention, the invention resides in a system for powering an automobile, comprising a device from separating a volume of water into hydrogen and oxygen components, a combustion engine operatively coupled to the device, an energy system control operatively coupled to the device, and an energy conversion apparatus operatively coupled to at least a portion of the automobile and configured to transmit energy to the energy system control.

In accordance with an additional embodiment of the invention, the invention resides in a device for generating electrical power from the motion of a wheel comprising a hollow ring having a plurality of coil members disposed throughout the ring and a magnet moveably disposed within the hollow ring. In one aspect of the invention, the magnet comprises a solid metallic arched cylinder, wherein a radius of curvature of the magnet is substantially similar to the radius of curvature of the hollow ring to enable movement of the magnet within the hollow ring.

In accordance with an additional embodiment of the invention, the invention resides in a device for generating electrical power from motion of a wheel, comprising a deformable wheel having a void within the wheel and a piezoelectric material disposed within the void, wherein said piezoelectric material is configured to create a charge upon deformation of the wheel.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

DESCRIPTION OF THE INVENTION

Figure 1:
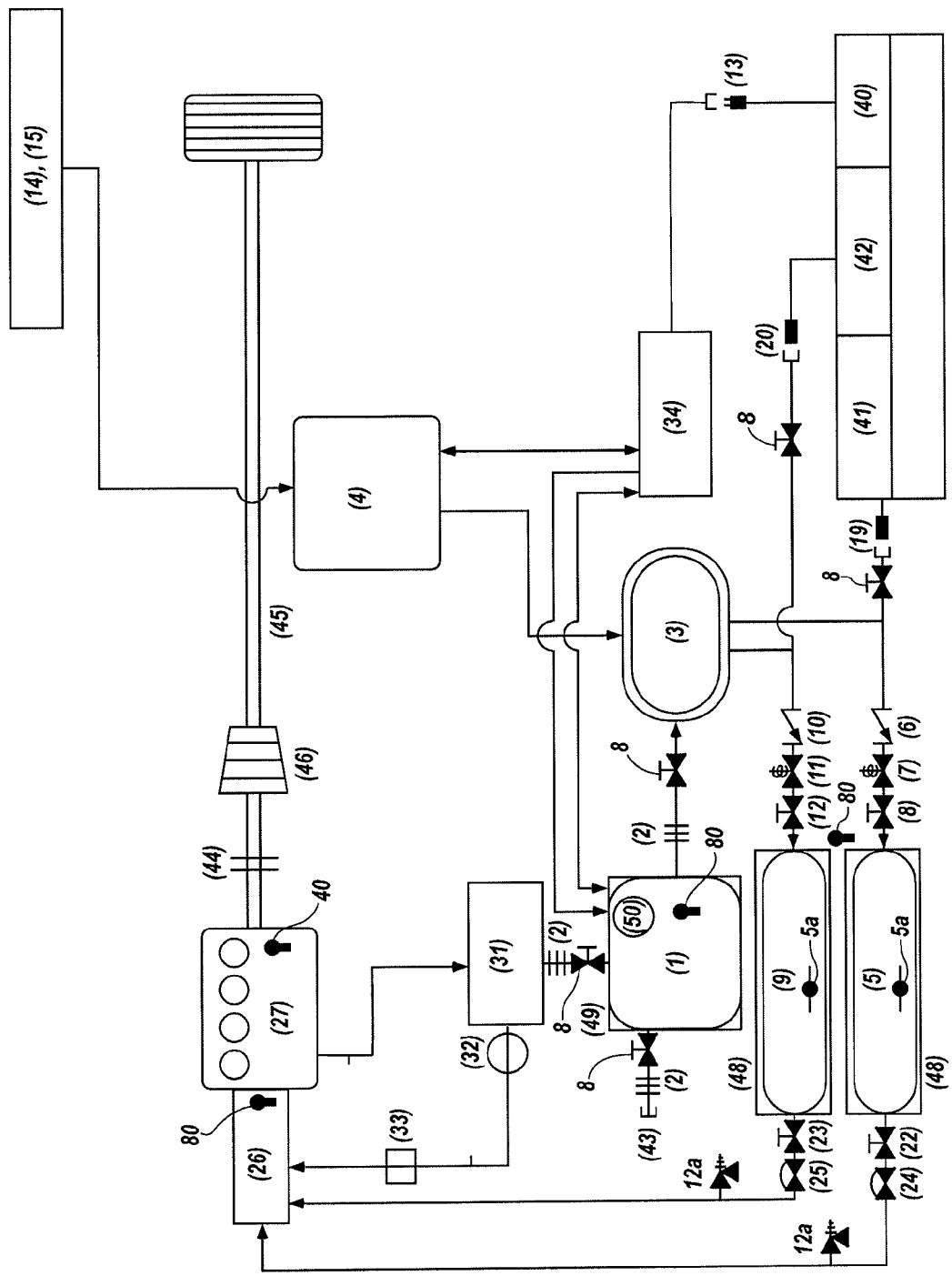
FIG. 1 is a schematic of a retrofit system according to one embodiment of the present invention.

The following description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Hydrogen has a higher energy density per unit mass than does gasoline and other fossil fuels, but a much lower energy density per unit volume. For example, the energy density by mass of methane, propane, gasoline, diesel, and methanol is 14.27, 16, 17.1, 17.18, and 40.29 lbs/100 kWh respectively. By comparison, the energy density by mass of hydrogen and on-board oxygen is 49.6 lbs/100 kWh.

In order to offset the lower energy density per unit mass, one embodiment of this invention relates to the cumulative benefits of recapturing all available lost forms of energy while the vehicle is in operation, including kinetic, friction, inertia, solar, heat and aerodynamic losses. Coupled with an optimized vehicle platform (i.e. lightweight structure, low drag configuration, reduced rolling resistance tires and low-loss wheel bearings) the overall vehicle efficiency increases to the level where it may have the potential to become partially self-sustaining. By harvesting energy losses, the proposed system will have the capability of generating fuel on-board the vehicle in the absence of an external power supply, such as a direct current electrical source to power the electrolyzer. The extent of vehicle's self-sustainability, or its capability to be mobile even while cut off from external supplemental energy, will depend on massive energy generation while in a static mode. In the event of natural disaster or any other interruption of fuel supply, the vehicle's partial autonomy could be highly useful. For example, an emergency vehicle after a hurricane when the electric grid is down and it is impossible to pump fuel or a military vehicle cut off from fuel supply lines.

One embodiment of the present invention's capability to optimize stored energy capacity will rely on the cumulative benefits of absorbing and recapturing every minute source of available energy. While the actual energy savings from each device or system may range from micro-volts on up to substantial electrical output, the sum of the overall energy harvest should significantly reduce overall energy requirements of the vehicle designed for this system and those so retrofitted, as is practicable.

While in static, non-operating mode, the vehicle will have access to multiple forms of energy to power the electrolyzer including solar skin, deployable solar awning, wind turbine, hydro propeller, and other means of generating energy. The solar skin will initially be constructed of state-of-the-art and near term solar technology which is effective only during daylight hours. As technology advances, the solar skin and deployable awning can be up-graded to full spectrum solar which will enable the system to capture infrared energy from the earth at night resulting from the sun's heat during the day.

In a dynamic or operating mode, depending upon its configuration, the vehicle will have the benefit of one or more of the following examples of generating electricity to power the electrolyzer; inertia wheel generators, regenerative suspension components, regenerative shock absorbers, piezoelectric generators fitted inside the tires, piezoelectric wake generators located on the rear and undercarriage of the body, exhaust heat-driven turbine with generator, infrared electrical generation, other heat containment strategies that convert heat into electrical energy, and regenerative braking. Other practical means of generating on-board electrical energy may be later added as suits a particular application. These may include a more efficient means of completing electrolysis and other energy recapturing devices or means of energy generation not yet devised. By spreading these individual energy recapturing systems through isolated circuits, an element of redundancy is inherently built into the system. If one fails there are still other means of recapturing lost energy which will continue to be operational.

One embodiment of the present invention utilizes water injection to cool the combustion chamber in order to eliminate pre-ignition of the hydrogen and oxygen fuel components. An additional benefit of water injection is its synergistic combustive properties with the hydrogen and oxygen fuel. It can be applied to produce more steam in the engine to create more power. The water can be injected with the hydrogen or oxygen. Alternatively, it can be injected separately into the cylinder head by another means. Aside from the high expansion rate of steam, it is thought that steam will help draw the heat from the internals of the engine.

In accordance with one aspect of the invention, a metal permeating lubricant or high temperature resistant synthetic oil may be used to ensure proper lubrication of the rings on the cylinder walls and other moving parts in the engine. Further, in one aspect of the invention ceramic coatings and/or ceramic material may be applied in the internal moving parts of the steam exposed components of the engine as a strategy to protect engine parts from failure.

It is believed that use of on-board oxygen when combined with the on-board hydrogen will result in a fuel mixture that can approach a nearly ideal, 100 percent combustion rate. Dry atmospheric air is comprised of approximately 21 percent combustible oxygen. The remaining air is 78 percent nitrogen and 1 percent other gases (argon, carbon dioxide, neon, helium, hydrogen, xenon, ozone and traces of water vapor) that are all inert and will not combust in conventional engines. The removal of these inert, non-combustible gases can give place to a like volume of highly combustible hydrogen and oxygen. It is thought that by varying the pressure of the injected fuels, small displacement internal combustion engines may be utilized to output substantial horsepower outputs, while retaining zero emissions. Because the present invention eliminates reliance on atmospheric air, the combustion of nitrogen and resulting harmful NOx emissions normally associated with engine combustion is eliminated.

Given the fuel is completely combustible and the water injection will permit the engine to safely operate at a higher temperature, it is anticipated that engine efficiency may increase. According to mathematical calculations, an engine fueled by hydrogen and oxygen, with 14:1 compression ratio, will have an estimated 65 percent efficiency. This figure approaches the theoretical limits of the Otto Cycle engine which is close to 70 percent. The selection of the stoichiometric ideal fuel and/or water injection mixture, the compression ratio, timing and other means of enhancing engine performance will determine the actual thermal efficiency. It is believed that in certain aspects of the invention, additional components, such as turbocharging and/or supercharging units, used in conjunction with a closed loop system that includes steam-driven exhaust turbine generators, and other devices or systems that recapture wasted engine heat, will enhance the overall engine efficiency.

Figure 2:
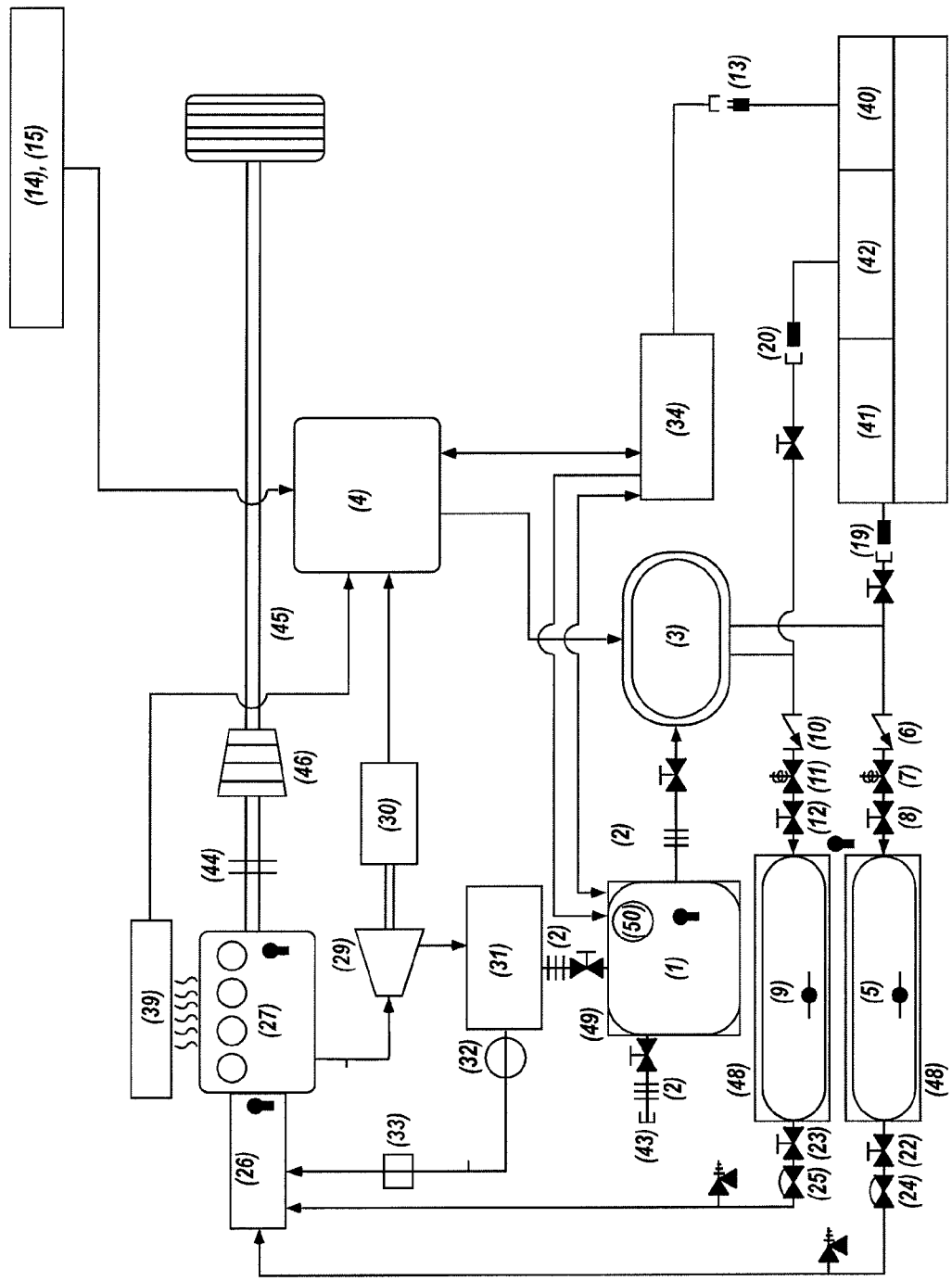
FIG. 2 is a schematic of a retrofit system according to one embodiment of the present invention.
Figure 4:
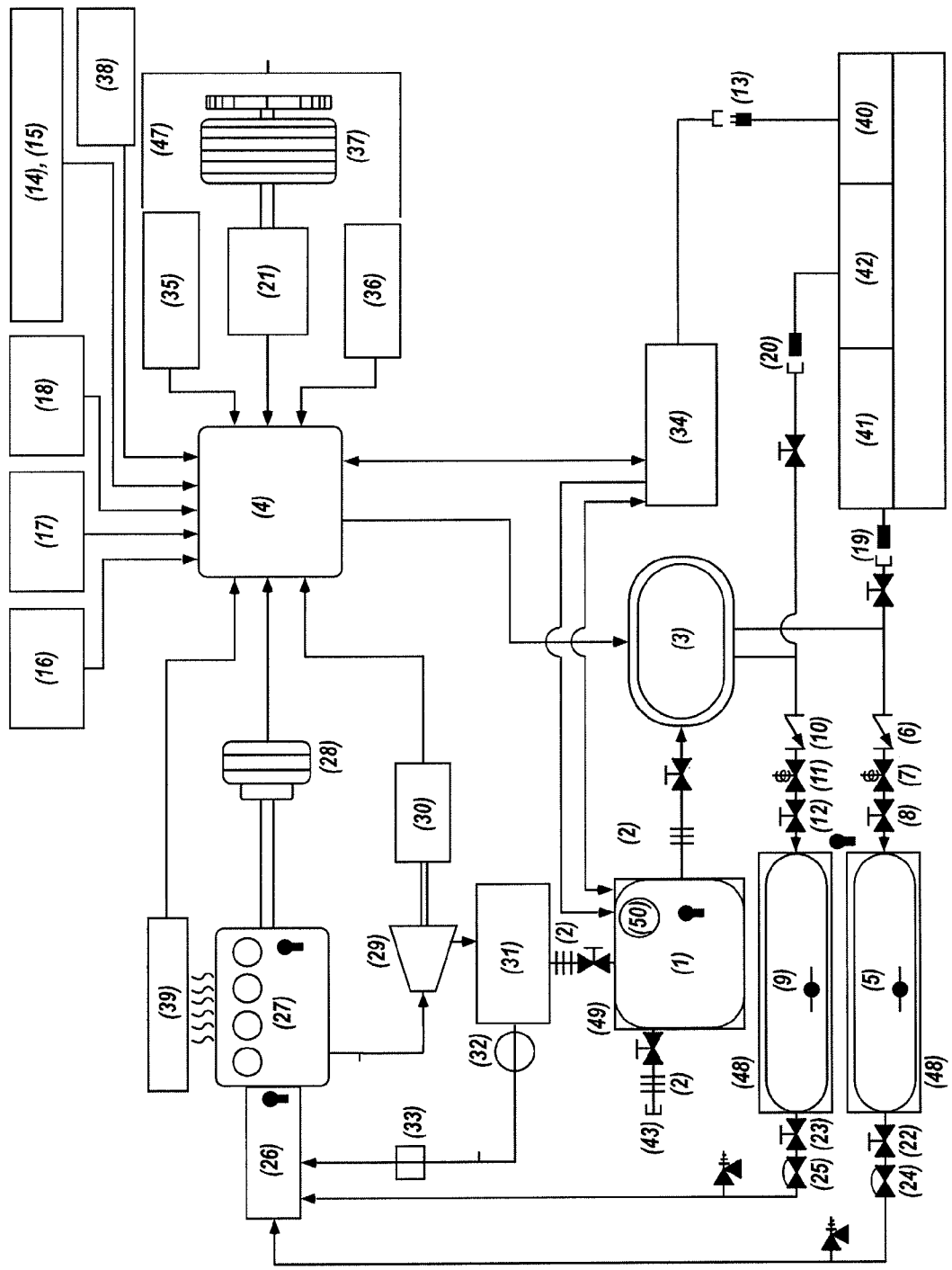
FIG. 4 is a schematic of a series power system according to one embodiment of the present invention.
Figure 5:
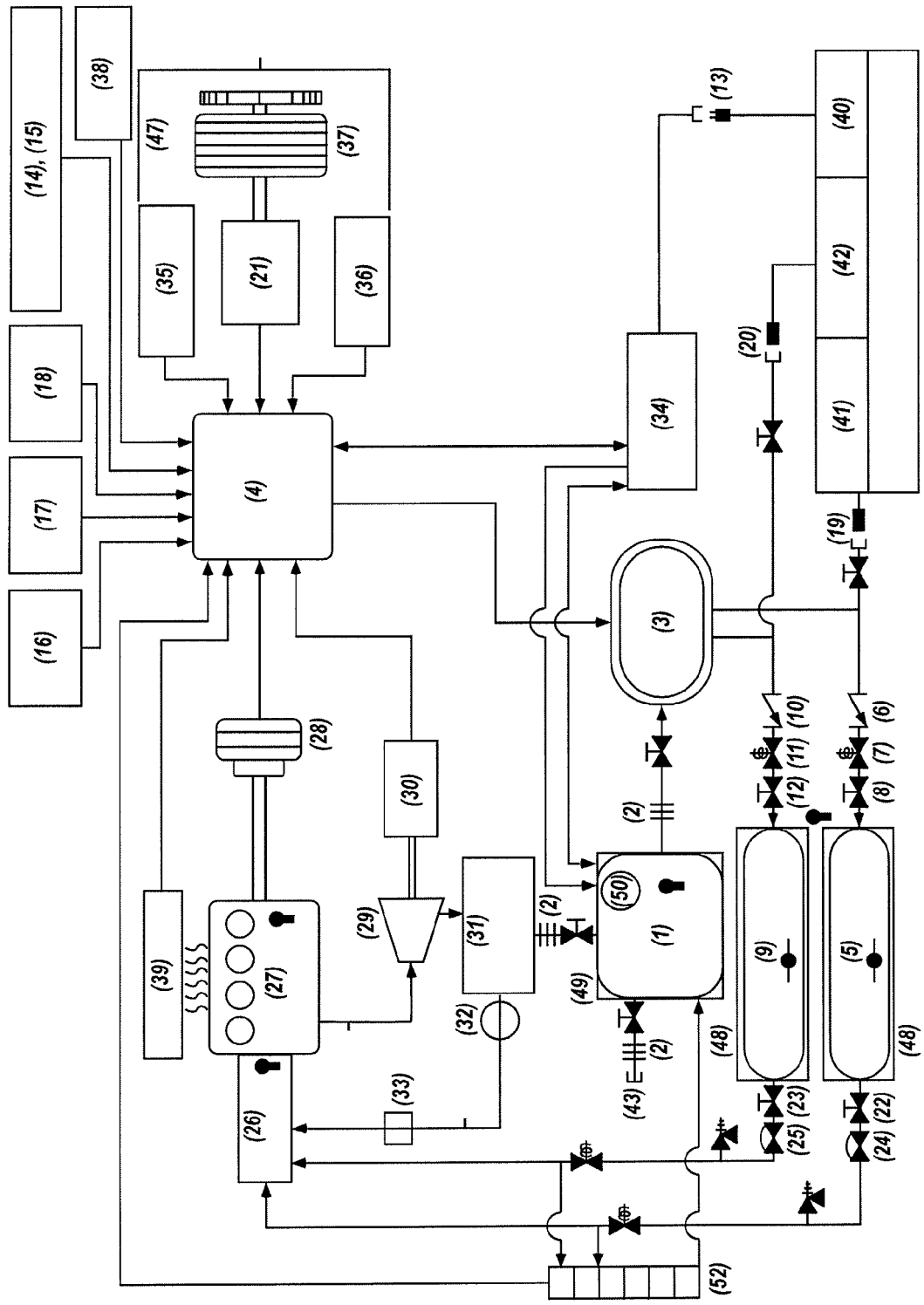
FIG. 5 is a schematic of a series power system according to one embodiment of the present invention.
Figure 6:
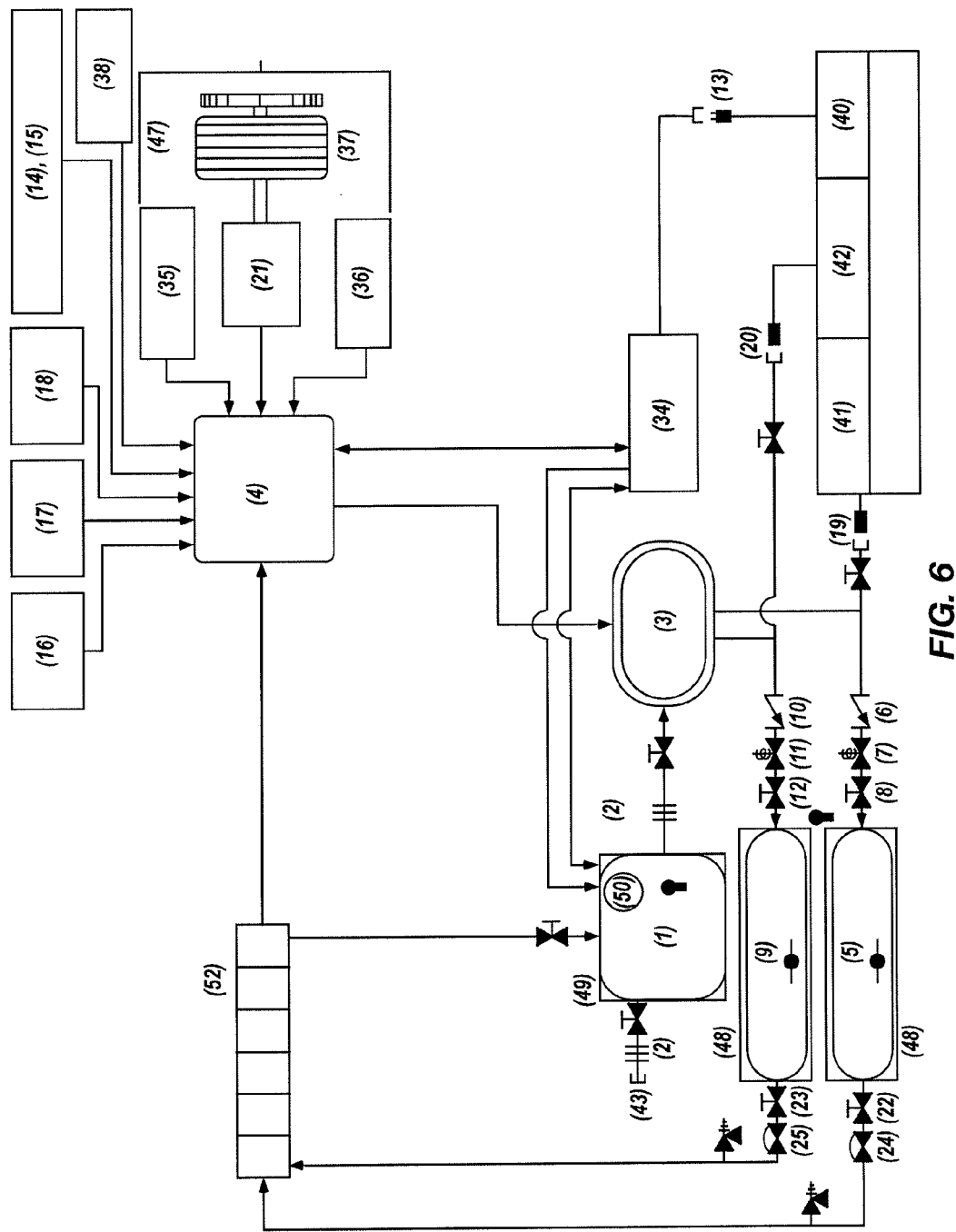
FIG. 6 is a schematic of a fuel celled system according to one embodiment of the present invention.
Figure 7:
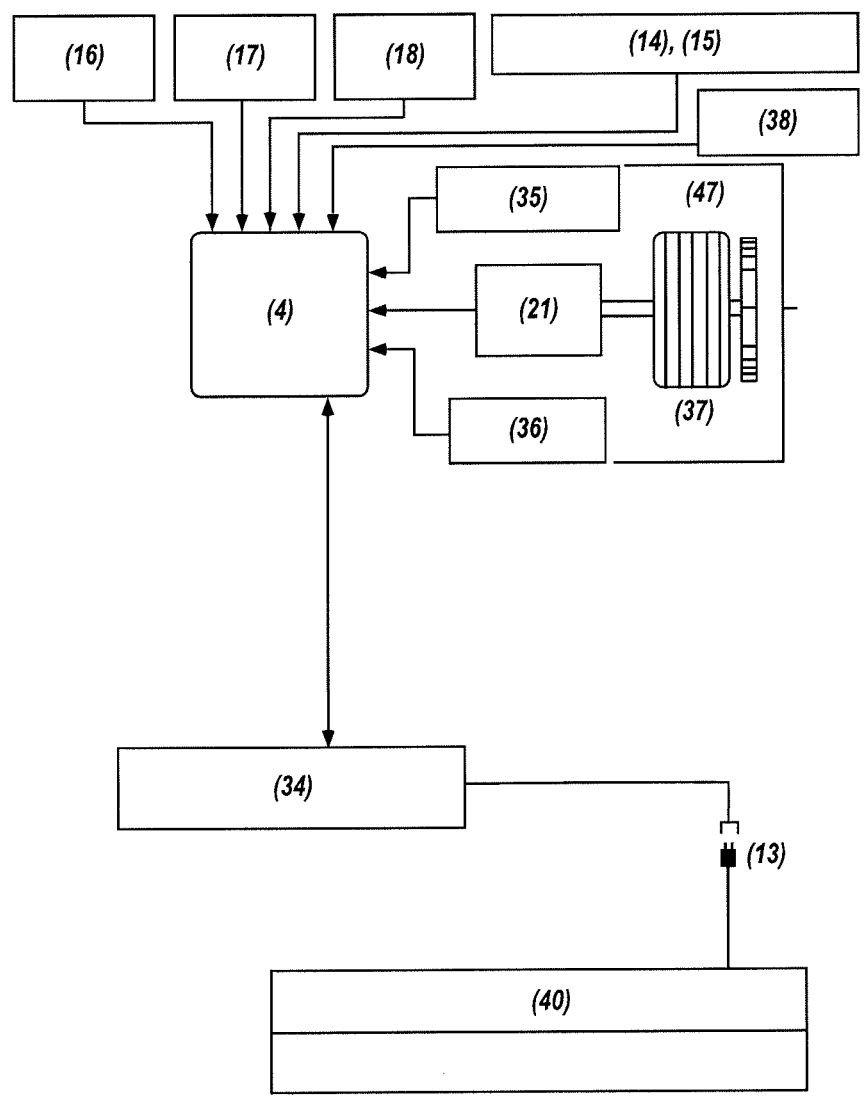
FIG. 7 is a schematic of a battery powered system according to one embodiment of the present invention.

In accordance with one aspect of the present invention, additional energy recovery components can be phased in and added upon as the commercialization of each component becomes available. Further, key elements of the core system (as shown in FIGS. 1 and 2) can be retrofitted to state-of-the-art transportation, therefore rendering its emissions-reducing benefits more readily applicable for public use. The system can be phased in from conventional automobiles, trucks and other categories of transportation, to hybrid-electric vehicles, both parallel and series (FIGS. 3-5), to fuel-celled vehicles (FIG. 6).

In accordance with one aspect of the present invention, there are a number of advantages of basing the power train on internal combustion engine technology versus a fuel cell. First, the majority of vehicles in use, and about 99 percent of global manufacturing capacity and tooling, are centered around internal combustion engines (two and four stroke reciprocating, diesel, rotary and other types). As such, the high volume of worldwide production renders the internal combustion engine an economical unit to purchase and repair. Whereas fuel cells are an emerging technology, they are costly to produce and require expensive metals such as platinum. In fact, it has been suggested that there is an insufficient supply of platinum to produce the fuel cells needed to re-power global transportation.

It has been reported that a zero-emissions fuel cell costs an estimated $1,000 per kilowatt output to produce. Conversely, a limited production, zero-emissions, closed loop internal combustion engine will cost close to $50 per kilowatt output to produce. Even if fuel cell prices drop 75 percent, selling at $250 per kilowatt output, which is not likely, a zero emissions small displacement engine in mass production could cost as low as $30 to $40 to produce. Second, conventional engines have a longer useful lifecycle than fuel cells and are not as sensitive to freezing or dry conditions. Third, an obvious case can be made for reparability. An internal combustion engine can be maintained or repaired by a dealer, local repair shop, or by an individual. On the other hand, fuel cell repair is a high-tech activity that is expensive and delicate. Lastly, sudden vibrations can damage the fuel cell membrane and fuel impurities can poison the delicate chemical balance of the fuel cell operating system. The issue of recycling thousands or hundreds of thousands of discarded fuels cells has yet to be addressed, as with the lack of hydrogen fuel infrastructure.

While embodiments of the present invention incorporate a small number of energy storage devices as an energy buffer, the majority of the energy storage may be achieved through the means of compressed hydrogen and oxygen in federally certified high pressure tanks. In one embodiment, the size of the storage tanks are more naturally suited for use in connection with light or medium duty commercial vehicles. It is believed that these tanks have an estimated life cycle up to 20 years of daily use. When the high pressure, gaseous $H_2$ and $O_2$ function as an energy storage device, the weight savings over the most advanced state-of-the-art batteries can be substantial. For example, a commercial delivery vehicle that travels 150 miles a day consumes 750 KWh per day of energy (having an average of 8 miles per gallon). If equipped with the latest Lithium-ion batteries sufficient to generate an equivalent amount of electricity, the battery pack would weigh 8,267 pounds. By comparison, an equivalent energy amount of $H_2$ and $O_2$ gas stored at 10,000 psi weighs approximately 372 pounds. This weight savings will dramatically improve the range and performance of the vehicle. When the tanks become unserviceable, the carbon fiber wound safety cover can easily be removed and the aluminum tank can be recycled. An additional application of the core system before it is dismantled, is to use it for stationary power generation.

During and after collision, safety cut-off valves can instantly prevent gas leakage. High pressure tanks have also demonstrated resilience to penetration by gunfire and large objects. They have also been proven to maintain safety even when placed in high temperature environments. Therefore, the use of low and high pressure tanks as storage for the hydrogen and oxygen is contemplated herein as one embodiment of this invention. Unlike batteries, which are sensitive to over or under charging, storage tanks can be partially filled or left unattended for years without adversely impacting their functionality.

Certain embodiments referenced herein are applicable for use in connection with numerous engine technologies. Accordingly, it is contemplated herein that use of a dual-fuel or multi-fuel engine that is capable of functioning with another fuel other than the on-board hydrogen and oxygen could be implemented. This added functionality would serve as a backup source of power should any single source become depleted, due to a system malfunction, inadequate passive energy generation, or other cause. The dual-fuel and multi-fuel function could be achieved utilizing the existing or supplemental fuel injection system and a separate exhaust system. This back-up system will provide a redundant means for fueling the vehicle in an emergency situation.

Power Train

Referring now to FIGS. 1 through 5, in one embodiment of the present invention, a method of fueling and powering vehicles with zero-emissions and/or use of renewable fuels in order to reduce pollution is presented. In one aspect, this is achieved because water is used as a fuel source to power the system and water (steam) is the emission from the combustion. The system is a closed loop in which water is split into gaseous hydrogen and oxygen, and then combusted and condensed back into water. The closed system eliminates the release of steam and related water vapors into the atmosphere.

Throughout the figures and description of the invention, like numerals represent like components. For ease in understanding common elements of the system, numerals 6 and 10 represent check valves, numerals 7 and 11 represent solenoid valves, numerals 8, 12, 22, and 23 represent manual valves, numeral 12a represents pressure relief valves, numerals 24 and 25 represent pressure regulators, numerals 5a and 9a represent gas sensors, numeral 80 represents thermostats, and numerals 19 and 20 represent quick disconnect fittings.

Ideally, in order to achieve true zero emissions and not contaminate the closed loop nature of the system, trace residues of engine lubricants and minute metal fragments that become mixed in the combustion process must be removed from the water system before it returns to the water tank 1. To reduce the lubrication requirements, low friction coated piston rings, ceramics, and/or other materials may be used in any or all parts of the engine 27. Lubricants that permeate the metal or nano-altered metals may also be applied. Because internal combustion engines require oil to lubricate, clean, and cool the internal parts, another embodiment of the present invention sets forth a method wherein trace residue mixed with the steam will condense and collect in a steam condenser 31 that also acts as a lubricant trap, and is designed to separate traces of engine oil and engine particles from the water.

In one embodiment, the present invention uses a water tank 1 to store water. Water can be sourced from various means; rain water, condensation, tap water, recycled water and distilled water. Whereas all forms of water, excluding distilled water, would require filtering or purification, for simplicity, the preferred embodiment of the present invention will utilize distilled water. The water tank 1 may be linked to the engine heat to warm the water. The hotter the water at the electrolyzer 3, the less energy will be required to complete electrolysis. An electrolyzer 3 is used to split the water molecules into their respective elements, hydrogen and oxygen. The electrolyzer 3 is capable of compressing the gases to 1,500 to 10,000 psi. This feature would eliminate the requirement for a low psi compressor. A reversible fuel cell, which is also capable of electrolysis, can be used as a Proton Exchange Membrane (PEM). Other state-of-the-art fuel cells are capable of electrolysis and are possible for use. In addition, future substitution of emerging technologies and those yet to be devised are also considered. Much like an electric vehicle, the electrolyzer 3 can be powered by a plug-in auxiliary power supply such as 110-volt or 220-volt electrical source 13, 40.

Passive means of electrically powering the electrolyzer 3 include a solar covered skin 14, a deployable solar awning 15, or other solar device, all of which may be fitted with part or full spectrum solar technology, as commercialization permits. Low-cost nano, solar, or some other form or combination of solar/heat engine system (e.g. Stirling Engine) to enhance the efficiency of the system are also applicable. Vehicles utilizing the present invention can be designed to be partially or completely covered with passive solar 14 technology that can be comprised of panels, thin flexible film, or paint that are permanently attached, bonded, detachable or added to the bodywork (e.g., roof, sides, front and rear) of the vehicle. Solar technologies include the state-of-the-art, emerging, and those types and forms yet to be devised. In addition, to help maximize solar absorption during the daylight hours, portions of the vehicle skin may also be automated to ensure the correct solar interface. That is, portions of the solar covered skin 14 of the vehicle may be attached to a device configured to adjust the orientation of the solar cells in an effort to optimize solar energy production. For example, a large solar panel placed on the top of a semi-trailer or railroad car, may be equipped with a mechanism for adjusting the orientation of the solar panel in an effort to capture the maximum amount of available solar energy.

The benefits of a full solar skin, especially in vehicles with a large surface area can be very useful. Depending on the surface area of the vehicle and the efficiency of the solar technology, it is feasible to generate considerable electrical energy. For a 30-foot para-transit vehicle, the surface area represents approximately 900 square feet. The average U.S. house consumes approximately 10,000 kilowatt-hours per year. This equates to approximately 27.4 kilo-watt hours per day. It is believed that a solar panel rated at almost 13 percent can generate an equivalent amount of energy out of a solar panel with an estimated 300 square feet. Taking into account the effect of shade on one side of the vehicle or the other, under ideal conditions, the solar skin will be able to generate enough solar energy to power two average American homes. Assuming favorable weather conditions, it is believed that this equates to approximately one hour of free vehicle operation per day, depending on the size and weight of the vehicle. Further, when the vehicle is not in use, it is believed that the vehicle could "re-fuel" itself over time. That is, the energy produced from the passive means could be used to power the electrolyzer process discussed herein.

Other passive means of energy creation include wind generation 16, hydro generation 17, and other forms described hereafter. The exterior of the vehicle has covered ports which, when opened, access a socket head (or other means on convenient attachment) that may be fitted with a lightweight helical (or other type) windmill 16 and a hydro propeller 17 line which can be inserted into a moving water current. As a last resort, a human powered generator 18 may be also fitted. The purpose of these units is to capture energy when the vehicle is at rest. If the daylight solar spectrum is used, then the supplemental wind energy and/or hydro energy may be used at night if conditions and location permits. Multiple ports could provide flexibility in selecting the best choice of passive energy.

Active or dynamic means of on-board energy recovery to create electricity to power the electrolyzer 3 are sourced by kinetic, inertia, friction, thermal and aerodynamic devices. Referring now to FIGS. 3 through 6, these auxiliary power sources may be a combination of any or all of the following: regenerative breaking 21, regenerative suspension 35, regenerative shock absorbers 36, inertia wheel generators 47, flexible piezoelectric tread generators 37, exhaust heat turbine generators 29, 30, engine heat container with infrared cell lining 39, aerodynamic piezoelectric wake generators 38 and other lost energy recovery techniques.

In one aspect of the invention, the electrolyzer 3 functions as both separator and compressor to place the two gases, hydrogen and oxygen, into separate high pressure tanks 5, 9 ranging from 1,500 to 10,000 psi. Additional lower pressure tanks (approximately 100 to 1,500 psi) may be used to store low pressure gases that would be created in the mobile mode. The recaptured electricity from the on-board energy recovery systems could be entirely depleted if it was directed to power a compressor capable of 10,000 psi. The advantage of low compression tanks is that they are more synchronized to the levels of energy recuperated and required by the vehicle while the vehicle is in operation. If it is determined that the energy draw of the 5,000 psi tanks are not overburdening the system, then the lower pressure tanks could be eliminated.

The hydrogen and oxygen is delivered to an oxidizer/fuel ratio control module at a reduced pressure. There the hydrogen mixes with the oxygen and is injected into the combustion chambers where the gases are ignited and combusted to move the cylinders or turbine rotors (or whatever configuration internal combustion engine is utilized) thus powering the engine. Water injection atomizes the water vapor which is introduced into the engine with the flow of hydrogen or oxygen or as a separate process. Again, one function of the water injection is to cool hot spots in the engine which may result in pre-ignition. When the fuel ignites, the water residue will vaporize into steam adding power to the engine and providing a means for capturing the heat from the internals of the engine to be expelled during the exhaust cycle.

Most hydrogen fueled vehicles rely on atmospheric air which is comprised of approximately 21 percent oxygen, 78 percent nitrogen and 1 percent miscellaneous gases (argon and other gases). As noted herein, the ultra-heating of nitrogen during the combustion process results in a chemical reaction leading to the formation of Nitrous Oxide/Dioxide (NOx). Although nitrogen is involved in the chemical reaction, it is inert and will not combust during the compression cycle. NOx is known to stimulate ozone production, a known contributor of smog in metropolitan areas. Smog, in high concentrations, can cause serious respiratory damage. Advantageously, fueling the present invention solely from the on-board $H_2$ and $O_2$ cylinders eliminates both carbon dioxide ($CO_2$) and nitrous oxide (NOx) emissions. The result, especially given the closed loop nature of the system, is a true zero emissions vehicle. In one aspect, hydrogen is combined with approximately fives times more oxygen than contained in atmospheric air. It is believed that the consequence is increased power output over that of a conventional gasoline fueled engine. Once the gases are burned, they combine again to become water in the form of steam and no pollutants are created. The steam created as an emission is condensed and recycled back into the water tank 1. In one aspect of the invention, $H_2$ gas and $O_2$ gas are combined together with another inert gas (such as Argon) to moderate the temperature of the combustion process (or other related processes) within the engine.

If used in a conventional vehicle, the engine horsepower and torque are transferred to a transmission 46 which, in turn, powers the drive wheels. In a parallel hybrid-electric vehicle (FIG. 3), an electric generator is inserted in front or behind the transmission before the drive wheels. In a series hybrid electric vehicle (FIG. 4), the engine is linked to an electric generator that powers the wheel motors that drive the wheels of the vehicle. A fuel cell vehicle (FIG. 6) electrically powers the wheel motors that propel the vehicle wheels. It is also possible to construct a dual mode vehicle, which is a combination of a series hybrid and a fuel cell version (FIG. 5), to create a vehicle capable of silent running with a low heat signature. In all of these aforementioned applications, the present invention can be configured to meet the respective requirements.

In one embodiment of the present invention, the power train can utilize any type of internal or external combustion engine or other power plant that is fueled by hydrogen and oxygen and can be used to propel the vehicle in a conventional means with a heat engine powering drive wheels, in series mode (indirectly) and/or parallel mode (directly) or power the onboard vehicle systems in a non-operational mode (parked). One embodiment of the present invention will be of a modular design so modules can be replaced as the technology evolves and/or combined to suit the requirements of the end user.

In order to provide flexibility in fueling, other auxiliary means of electrical generation are utilized to power the electrolyzer 3. Depending on the purpose of the vehicle using the present invention, different electrical sources can or should be used. A standard among vehicles stationed at a home or commercial is to use plug-in electric power from the grid 40 in addition to the auxiliary on-board power generators to energize the electrolyzer 3. A higher output base station 41, 42 electrolyzer could also be utilized for a fast fill of the hydrogen and oxygen cylinders. These could also be used to quick fill the $H_2$ and $O_2$ tanks directly much like a compressed natural gas (CNG) commercial fueling station. To offer flexibility to the end user, the system will also provide for external fueling and/or changing out the empty hydrogen and oxygen tanks with pre-filled tanks.

In one embodiment, a vehicle that will utilize the power system of the present invention will be designed to minimize aerodynamic drag and rolling friction. In addition to the benefit provided by the auxiliary power sources, vehicle weight should be reduced for further gains in efficiency. The synergistic effect of a lightweight, efficient vehicle in tandem with the wide complement of on-board energy recovery systems that will help offset the low energy density of hydrogen in comparison to hydrocarbon fuels.

Advantageously, the present invention eliminates the need for a new hydrogen infrastructure for refueling hydrogen vehicles. In one aspect, the present invention implements an on-board hydrogen refueling system that will eliminate the need for hydrogen refueling stations and hydrogen transportation that the prior art needs to function. Another advantage of on-board fuel generation is enhanced safety. A system that eliminates a repetitive fueling process removes the chance of fuel leakage due to worn components or human error.

Because the hydrogen and oxygen act as energy carriers, one of the benefits of the present invention is to reduce the battery and/or ultra-capacitor size. Since the use of chemical energy storage is limited to function mostly as an energy buffer, the size of the batteries and/or energy buffer is significantly smaller than a conventional hybrid-electric, or a pure electric system which relies solely on batteries. One objective of this approach is to reduce after-use waste (from the disposal of chemical batteries and toxic ultra-capacitors) which, in turn, will reduce ground pollution.

Reduction in battery capacity is accomplished because in the process of electrolysis, the pressurized hydrogen and oxygen function as an energy storage device that has similar characteristics to a rechargeable battery. Powering the electrolyzer converts the water into hydrogen and oxygen that act as energy storage device. As the hydrogen and oxygen are combusted in the engine their potential energy is converted to kinetic energy (energy carrier) to drive the engine and they are combined to become water that is recycled again.

The primary obstacle of a pure electric vehicle is once the battery charge is depleted and no means of external charging are available, the vehicle becomes immobilized. The present invention shares some characteristics of an electric vehicle. Essentially, it is a plug-in, zero emissions and internal combustion vehicle (it can also be configured in the other variations as described above). Like an electric vehicle it can be depleted of its available zero-emissions on-board energy storage. However, unlike an electric vehicle, when fitted with an internal combustion engine (or other heat engine; diesel, rotary, turbine, etc) the present invention can be flex fuelled. That is, a separate fuel tank, fuel system and exhaust can be co-joined with the system to provide emergency mobility if any of the core systems malfunction or the fuel tank simply runs empty.

Referring to FIGS. 1 through 6, the water tank 1 is filled at the water refill 43 and passes through the first water filter 2 with distilled water, tap water, stored rainwater or water collected from condensation. Water passes through another filter 2 into the electrolyzer 3 (PEM or other type) where it is split into gaseous oxygen and hydrogen and pressurized. The electrolyzer 3 is powered from the energy system controller 4 that distributes power from all the various onboard electrical power sources.

High pressure hydrogen from the electrolyzer 3 flows into a high strength (1,500 psi to 10,000 psi), fire resistant, and impact resistant filament wound (or other configuration) storage cylinder 5 through the check valve 6, solenoid valve 7 and manual shutoff valve 8. Similarly, high pressure oxygen from the electrolyzer 3 flows into a high strength (1,500 psi to 10,000 psi), fire-resistant, and impact-resistant filament wound (or other configuration) storage cylinder 9 through the check valve 10, solenoid valve 11 and manual shutoff valve 12. In the event it is determined that low pressure tanks (0 to 1,500 psi) are required, then the above will be duplicated utilizing two, lower volume hydrogen and oxygen storage cylinders. These will consume less energy to compress during driving.

At night, or during non-use, an external source of electricity from the grid 40, or created on site by fixed body solar 14, deployable solar awning 15, wind 16, hydro 17, human 18, or aerodynamic wake 38 generators may be used to power the electrolyzer 3 to fill the hydrogen 5 and oxygen 9 cylinders to partial or full capacity before the vehicle is placed back into operation. Similarly, the hydrogen 5 and/or oxygen cylinder 9 could be externally refueled or exchanged for filled cylinders on site 41 and 42.

According to one aspect of the present invention, the hydrogen 5 and oxygen 9 storage cylinders, are placed in a protective energy absorbing storage containers 48 that is designed to provide additional safety in the event of collision. Another function of these containers is they will provide a means of trapping escaped gas from the storage cylinders. The storage containers could be filled with water to provide a medium for the stored gases to absorb into. On the inside and outside of these storage containers will be gas sensors and back-up gas sensors to provide redundancy in case of a sensor malfunction which will immediately shut down the process of electrolysis and the vehicle if a gas leak is detected. This will prevent any build up of excess gases in the storage containers.

In order to create the electricity required to power the electric drive motors 21, the hydrogen and oxygen from the storage cylinders 5, 9 are used as gaseous fuel for the internal combustion system. The hydrogen and oxygen each flow through a manual shutoff valve 22, 23 and a pressure regulator/controller 24, 25 to an oxidizer/fuel ratio control system 26 where the gases are mixed and injected into the combustion chamber of the engine 27. The hydrogen internal combustion engine can be virtually of any kind (e.g., piston, rotary, turbine, diesel, etc.), including external combustion. As in FIGS. 5 and 6, a fuel cell may also be substituted or supplement the heat engine. In a series mode, the hybrid power unit can also function like a generator, set to create electricity, but it will consume on-board fuel.

It is believed that the present invention, relying solely upon the on-board hydrogen and oxygen for combustion, will have near zero harmful emissions. Under this operating mode the only emissions through the exhaust will be heat and water vapor. The water vapor may be captured, condensed 31, and returned to the water storage tank 1. As the present invention operates, the expended heat energy (steam) will drive a turbine 29 that drives a generator 30 to deliver power to the energy system controller 4.

In accordance with one embodiment of the present invention, there may be one or more steam turbines stacked next to each other or located on different points of the exhaust system. The function of the above-referenced steam turbines is to convert the super-heated steam into electrical energy. In one aspect, the lead turbine will speed faster, the second slower, and so on, until the last one hardly spins at all, which shows the energy has been expended from the exhaust system. In an additional aspect of the invention, a thermal container lined with infrared cells 39 will surround the heat engine 27 and portions of the exhaust system. The infrared cells 39 convert the trapped heat energy into electricity to be fed back into the energy system controller 4 to power the electrolyzer 3.

In an additional aspect of the invention, unburned $O_2$ and $H_2$, still in gaseous form, are drawn out of the top of the steam condenser 31 by a fan 32. The levels of unburned $H_2$ and $O_2$ are analyzed by an $H_2/O_2$ sensor 33 which relays information back to the ratio control 26. In one aspect, the relay, if required, changes the $H_2/O_2$ fuel mixture to minimize the amount of unburned $H_2$ or $O_2$ molecules. Remaining unburned $H_2$ and $O_2$ molecules are drawn back through to the engine 27 and fed into the combustion chamber to be burned more properly to form water molecules.

In one embodiment, a lubricant trap is fitted to the steam condenser 31 to separate (by condensation, centrifuge, or other means) all traces of lubricant residue from the re-collected, condensed water supply. Provisions will be made to enable the collected lubricant to be removed and cleaned from the steam condenser 31 and lubricant trap.

The residue $H_2O$ is collected and returned, through a filter to the $H_2O$ Tank 1. The previously described process enables the present invention to be a closed system, which means that all, or nearly all, of the $H_2O$ in the system will be recaptured thereby requiring little, if any, refilling of water in the system. To prevent freezing of the water supply in inclement weather, the $H_2O$ Tank 1 will be equipped with a thermal container 49 and lined with an electrical heating element. This heating element will be powered by the energy storage contained in the energy buffer 34 when the thermostat within the thermal container 49 signals that temperatures are approaching freezing conditions.

In an additional aspect, to further protect the water lines from freezing, a vacuum pump 50 attached to the $H_2$ tank 1 will activate to purge the lines of their water content. Aside from eliminating the need to add water, a secondary benefit of a closed loop system is the removal of noise pollution from the exhaust process.

In one embodiment of the present invention, electricity flows through an energy system controller 4 that will distribute power to the electric drive motors 21. The electric drive motors 21 may be of a multitude of different types, including, but not limited to, DC, AC, brushless DC, air or liquid cooled. When the vehicle brakes or when the operator lifts off of the accelerator, the electric drive motors 21 convert over to a regenerative braking mode. In this mode, the electric motors 21 act as electric generators that recapture the kinetic energy used to accelerate the vehicle initially and transform it back into electricity. This regenerative braking electricity is returned to the energy system controller 4 where it can be distributed to power the electrolyzer 3 which in turn splits the water into hydrogen and oxygen to replenish the non-carbon-based on-board fuel supply or it may be stored in the energy buffer 34 storage batteries until required by the electrolyzer 3 or any other electrical device as noted herein.

In addition to the regenerative braking 21, electrical energy may be derived from inertia wheel generators 47 placed on the rims of the wheels (inside the inflated area of the tires) or outside the wheel like a spinning hubcap (described in detail hereafter), regenerative shock absorbers 36 that are fitted with linear generators that re-capture the suspended motion of the moving vehicle, and/or regenerative suspension 35 components which are fitted with piezoelectric generators that brush against each other as the suspension pivots to create electrical current. This supplemental electrical energy would also be received and distributed by the energy system controller 4 to power the electrolyzer 3 to further create $H_2$ and $O_2$ gas. Likewise, piezoelectric tire generators 37 are fitted to the inner liner of the carcass of the tires to capture the friction energy the moving vehicle. In one embodiment, the piezoelectric tire generators comprise one or more layers of piezoelectric fabric that flex or rub against each other to create current as the tire bulges when it makes contact with the pavement or surface of the ground. These piezoelectric tire generators 37 feed recaptured lost kinetic and thermal energy through the energy system controller 4 to the electrolyzer 3 or energy buffer 34. Other forms of electrical generation that can be installed on the vehicle, that have yet to be devised, from natural energy or other means, can be added in the future.

When out of service (e.g., in a parked mode) the present invention can derive power from the system described below to power the electrolyzer 3. Detachable wind generator(s) 16 can be affixed into generator "ports" on the vehicle. A hydro-generator 17 can be placed in a moving body of water. In addition, as a last resort, a human-powered generator 18 can be used. The on-board solar 14 and deployable solar awning 15 will also provide a means of fuel generation utilizing the electrolyzer 3.

In one aspect of the present invention, solar panels 14 will be integrated or molded into the outer skin of the body. While photovoltaic cells have been available for a number of years, they are known to be expensive, prone to damage and difficult to maintain. Nano-solar cells which can be molded smoothly into the curved skin of the vehicle, as opposed to flat conventional solar panels are contemplated for use herein. Nanosolar strips can be likened to photographic film and is, therefore, substantially less per square foot in cost than rigid solar panels. In one aspect, the solar panels may be painted on. In this instance, the larger the external area of the vehicle, the more it will benefit from the solar effect. Also contemplated herein is the use of "full spectrum" solar cells which are designed to capture light invisible to the eye—from ultraviolet to infrared. This would also make it possible to refuel the vehicle at night. The entire exterior of the vehicle, including for example, the windows, could be covered with nanosolar technology. The vehicle exterior could also be configured to maximize the solar effect as the sun rises and sets during the course of a day. This means that the outer body could be automated to change the shape (that is non-structural). A solar awning 15 can be deployed for more solar surface area.

In one embodiment, the energy system controller 4 functions as the primary systems control for the entire drive-train, fuel supply, and auxiliary power systems. It receives electrical power from the primary and auxiliary power sources and distributes it where needed depending on the available supply of power from each of these sources and the current energy demand. The energy system controller 4 controls electrical energy flow to and from the motor/generators 21, the energy buffer 34 and the electrolyzer 3. It will monitor and protect the electrolyzer 3 from irregular electrical energy flow and spikes and will also monitor power to the speed controller that, in turn, controls the electric drive motors 21.

When out of use, the electrolyzer 3 can be powered at any time, day or night (on-peak or off-peak), by plugging the vehicle into the electrical grid 40. In the event that an $H_2$ and/or $O_2$ refueling station becomes viable, the $H_2$ and $O_2$ storage tanks 5, 9 could be filled at a base station from high pressure $H_2$ and high pressure $O_2$ tanks 41, 42.

Figure 3:
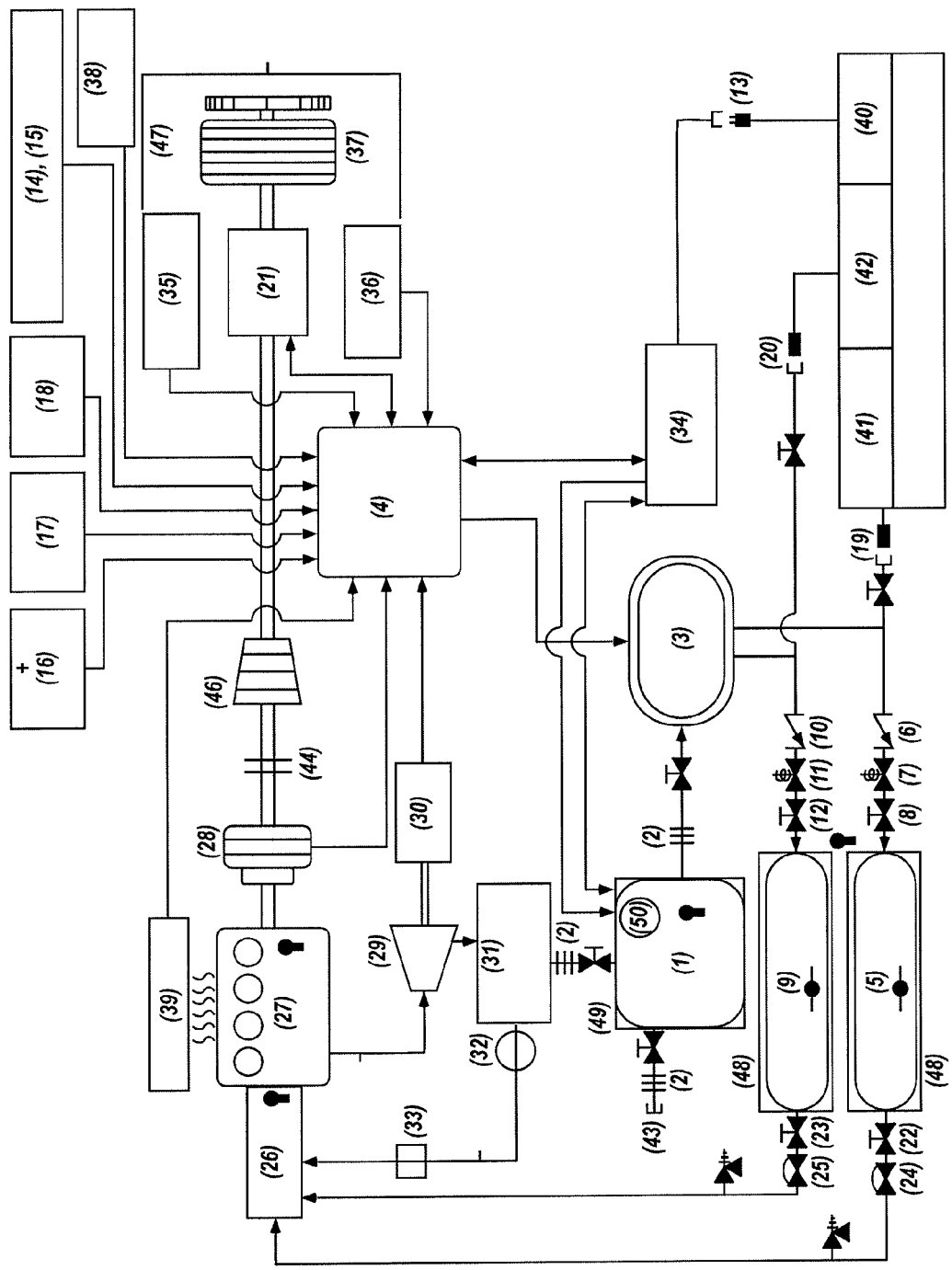
FIG. 3 is a schematic of a parallel power system according to one embodiment of the present invention.

Referring to FIG. 3, with slight modification, the hydrogen engine can be mechanically connected to the wheels to improve performance, through a clutch 44, transmission 46 and a driveshaft 45. It can also be fitted with a supplementary fuel system which would provide an emergency back-up to the hydrogen and oxygen on-board fuel system if it becomes depleted or the system malfunctions.

Stationary System

Figure 8:
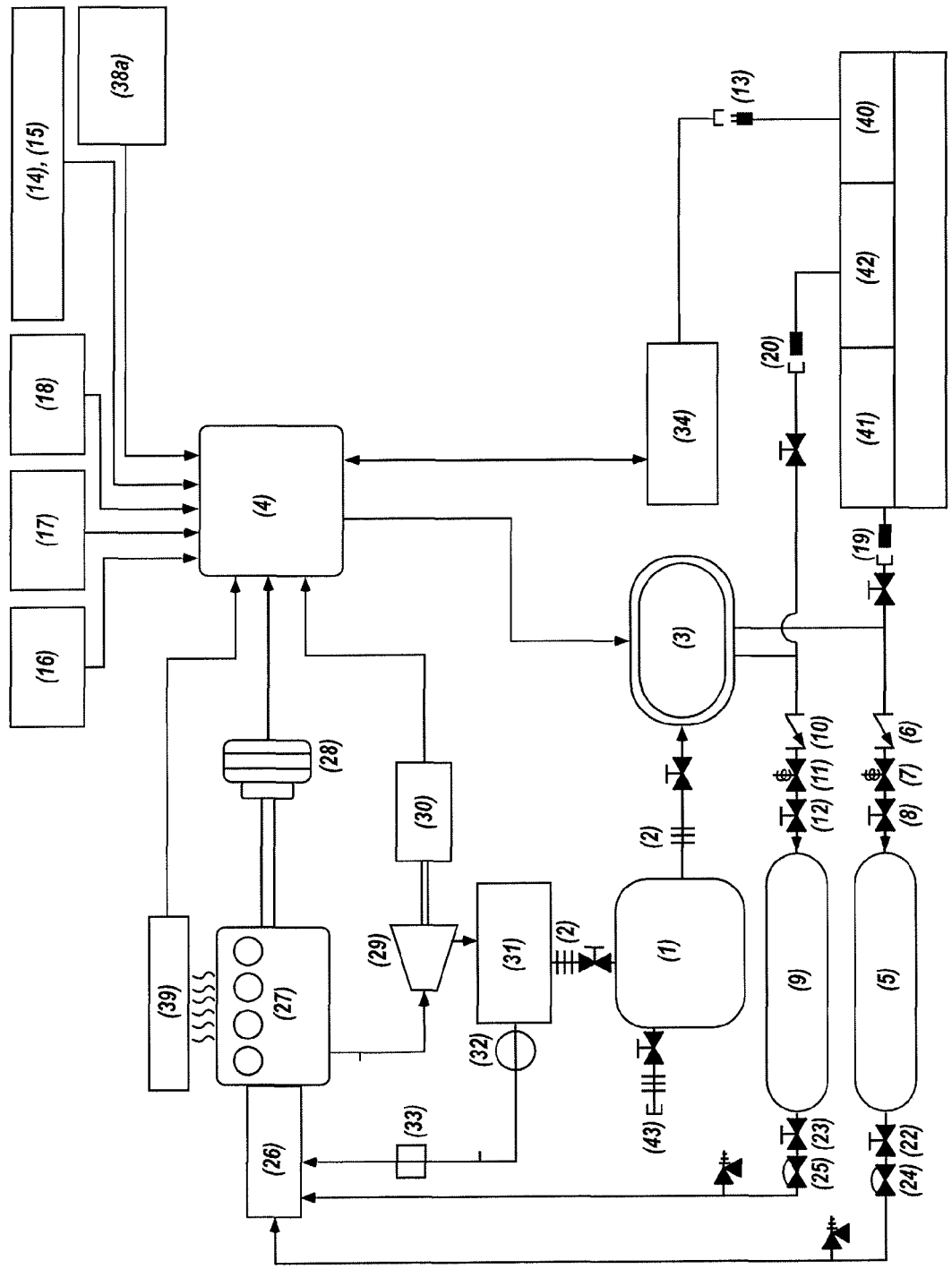
FIG. 8 is a schematic of a non-mobile system according to one embodiment of the present invention.

With reference now to FIG. 8, in one embodiment of the present invention, components described in sections above may be utilized to generate power in different forms, including electricity. The ability of current stationary systems for producing power which rely on alternative sources of energy, like solar and wind power, is subject to unpredictable weather patterns. Due to the nature of those systems, it is difficult and very expensive to store the value of the power generated from solar and wind-powered systems. In some instances, very expensive battery banks may be used to store energy produced during a wind event or during the day when the weather is not obscuring the transmission of radiation from the sun.

As noted, use of components described in the above sections in a stationary system will allow for the temporary "storage" of potential power. Specifically, wind 16, hydro 17, geothermal 38a, and solar-derived energy 14, 15 may be used when that energy is available (i.e., when conduced by the weather or otherwise) in connection with an electrolyzer 3 (PEM or other type). The electrolyzer 3 may be equipped with a switch that responds to the detection of DC voltage, for example, received from an electricity producing component of any known solar or wind generating device. Water may be gravity fed to the electrolyzer 3 through activation of a solenoid valve. The solenoid valve may be activated concurrently with the electrolyzer switch referenced above. Available water is passed through the electrolyzer and split into gaseous oxygen and hydrogen where it is thereafter pressurized and stored in available storage cylinders 5, 9. The gaseous oxygen and hydrogen can be stored for later use in connection with an internal combustion process, including processes described above. In this manner, the unpredictability of the alternative sources of power is tempered by the storage of that power in the form of gaseous oxygen and hydrogen.

Inertial Wheel Generator

In another embodiment of the present invention, an apparatus for generating power from the inertial movement of a wheel is contemplated. While use of the invention is described for use in connection with a wheel on the moving vehicle, any wheel which is subject to a rotational movement is contemplated herein.

Referring now to FIGS. 9 through 12, in one embodiment, a device for generating electrical power from the motion of a wheel is disclosed comprising a hollow ring 53 having a plurality of coil members 55 disposed throughout the ring 53 and a magnet 60 disposed within the hollow ring 53. The hollow ring 53 comprises a light-weight material, including, but without limitation, polymeric materials such as polyester, vinyl ester, epoxy, polyimide, polyamide, polypropylene, and/or PEEK. In one aspect, the hollow ring 53 may comprise a composite material of fiber-reinforced thermoplastics or fiber-reinforced polymers. In one embodiment, the coil members 55 are integrally formed within a wall 54 of the hollow ring 53. The coil members 55 can comprise a conductive material (e.g., copper, aluminum, steel, and/or organic semiconductors). While reference is made herein to a single magnet 60, it is understood and contemplated that multiple magnets could be used as suits a particular application. The magnets could be aligned in series or disposed in a parallel orientation.

In one embodiment, the magnet 60 comprises a solid metallic arched cylinder, wherein a radius of curvature of the magnet 60 is substantially similar to the radius of curvature of the hollow ring 53. In yet another aspect, the magnet 60 comprises a plurality of magnets laterally connected to one another with a hinge member. In one aspect, the hollow ring 53 is operatively coupled to the energy system controller 4 shown in FIGS. 3 through 6.

Faraday's law of induction (or the law of electromagnetic induction) states that the induced electromotive force in a closed loop is directly proportional to the time rate of change of magnetic flux through the loop. Moving a conductor (such as a metal wire) through a magnetic field produces a voltage in that conductor. The resulting voltage is proportional to the speed of movement: moving the conductor twice as fast produces twice the voltage. The magnetic field, the direction of movement, and the voltage are all at right angles to each other. A fixed conductor will also have an induced voltage if the magnetic flux in the area enclosed by the conductor is changing. During times of rotational acceleration or deceleration of the hollow ring 53, the magnet 60 will move within the hollow ring 53. In one aspect, the magnet 60 will move within the hollow ring 53 opposite the direction of the rotational acceleration or deceleration of the hollow ring 53. In one aspect of the present invention, as the magnet 60 passes through the hollow ring 53, voltage is induced within the coil members 55 of the hollow ring 60. In one embodiment, the hollow ring 53 may be part of a modular system that may be connected to the wheel of a car (e.g., as part of the hub cap). In another embodiment, the hollow ring 53 may be integrally formed with a frame of the wheel (e.g., as part of the rim of a tire), or attached to the existing wheel.

Figure 9:
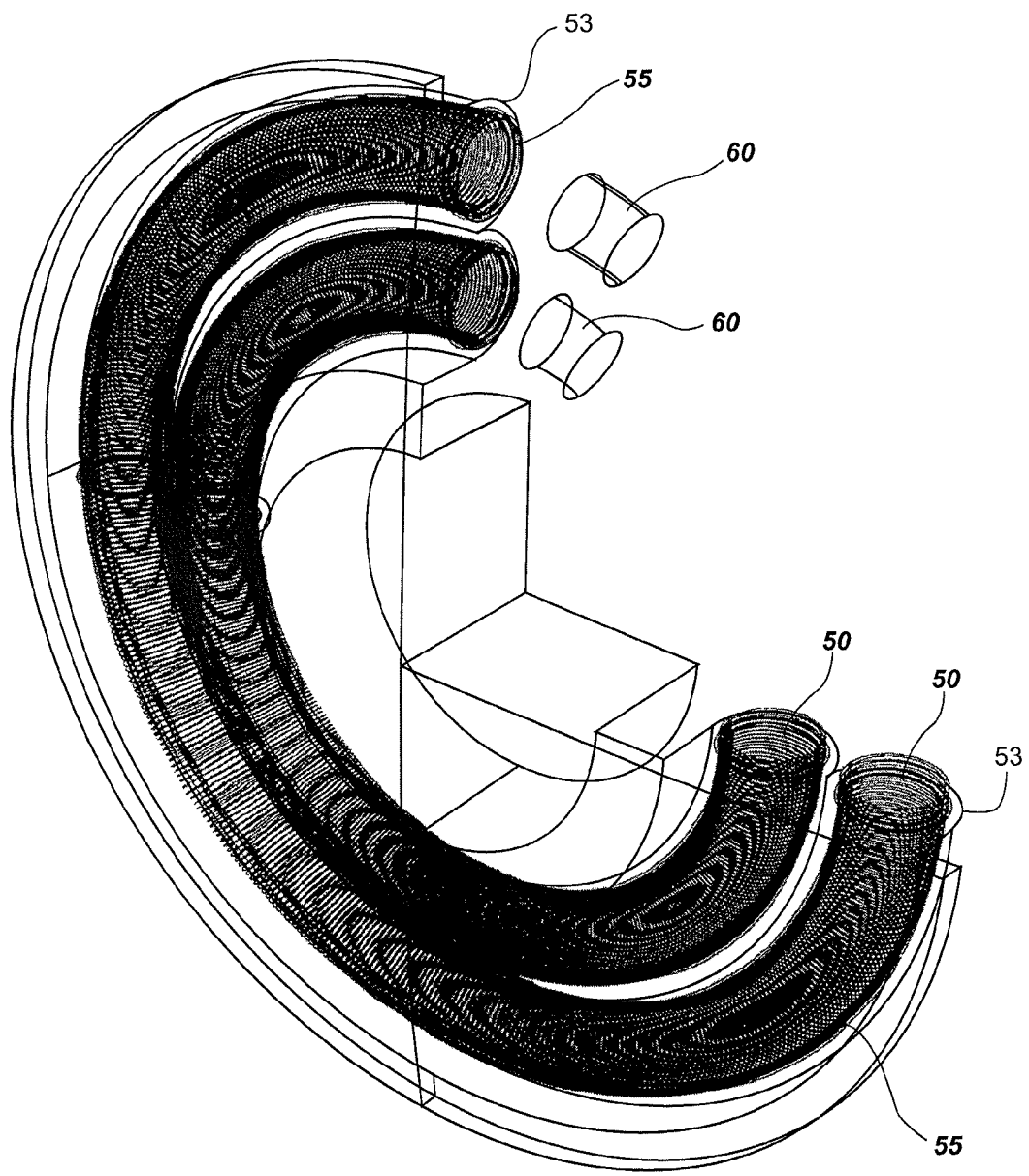
FIG. 9 is a perspective view of one embodiment of the present invention.
Figure 10:
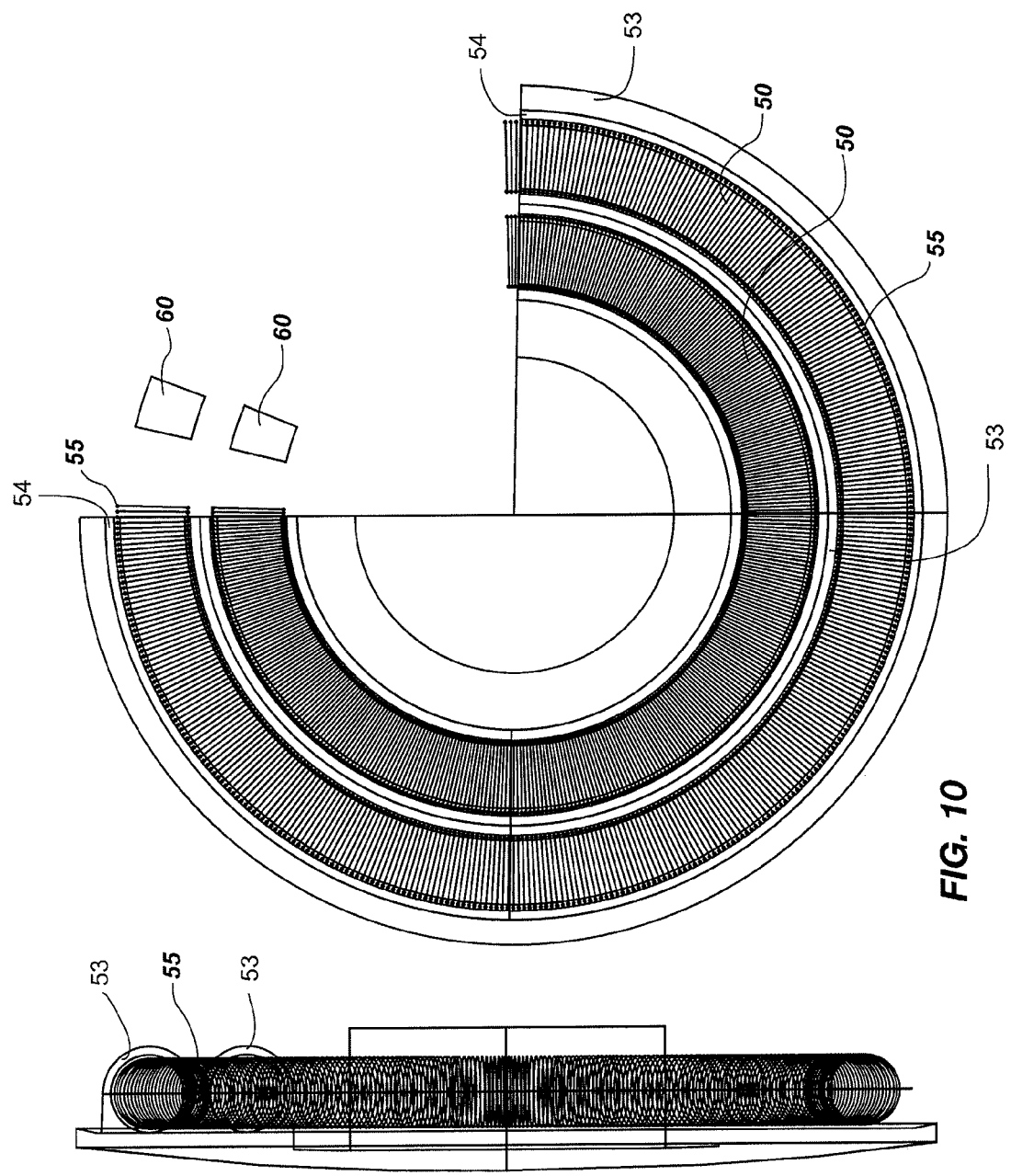
FIG. 10 is a side view of one embodiment of the present invention.
Figure 11:
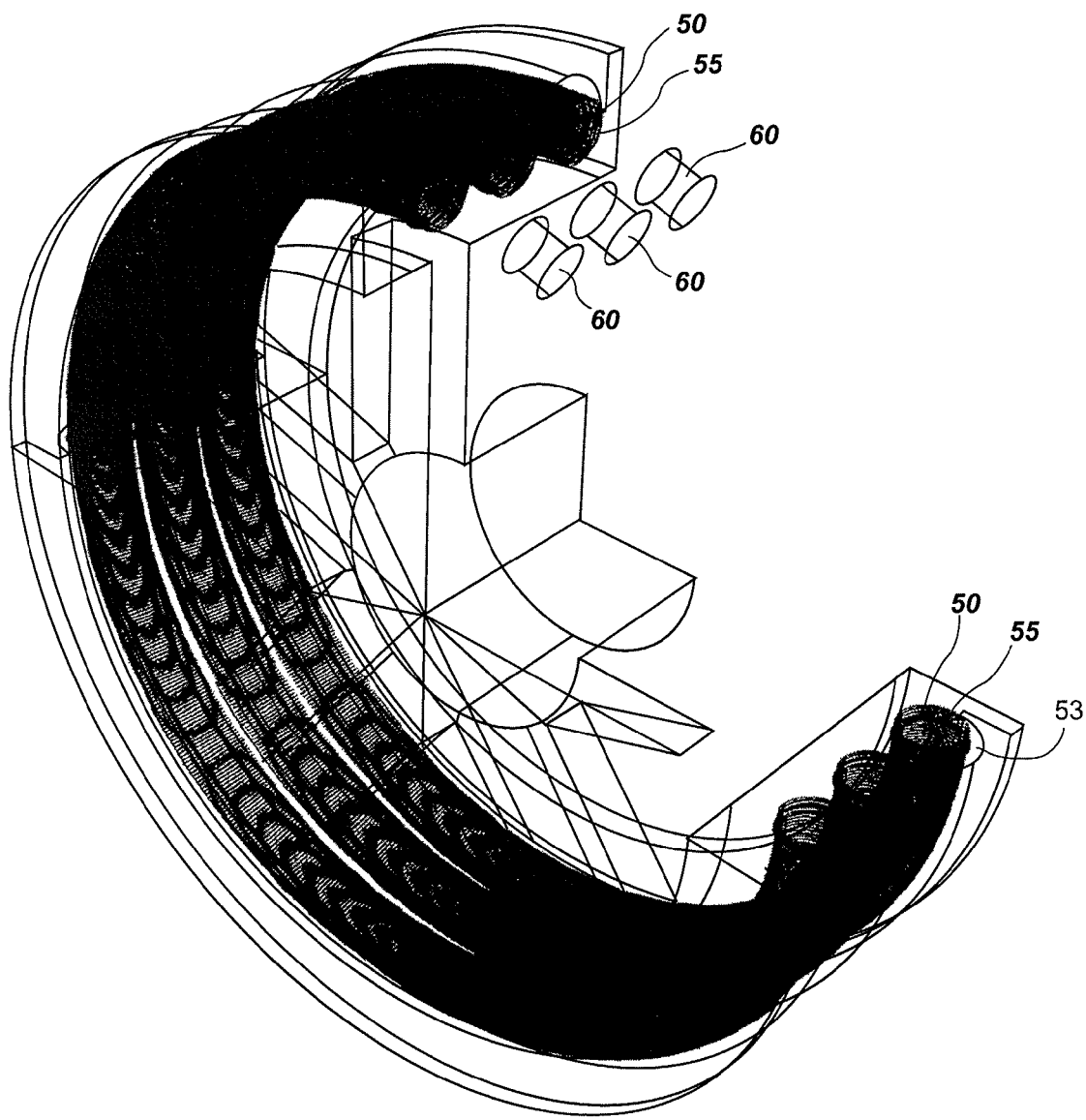
FIG. 11 is a perspective view of one embodiment of the present invention.
Figure 12:
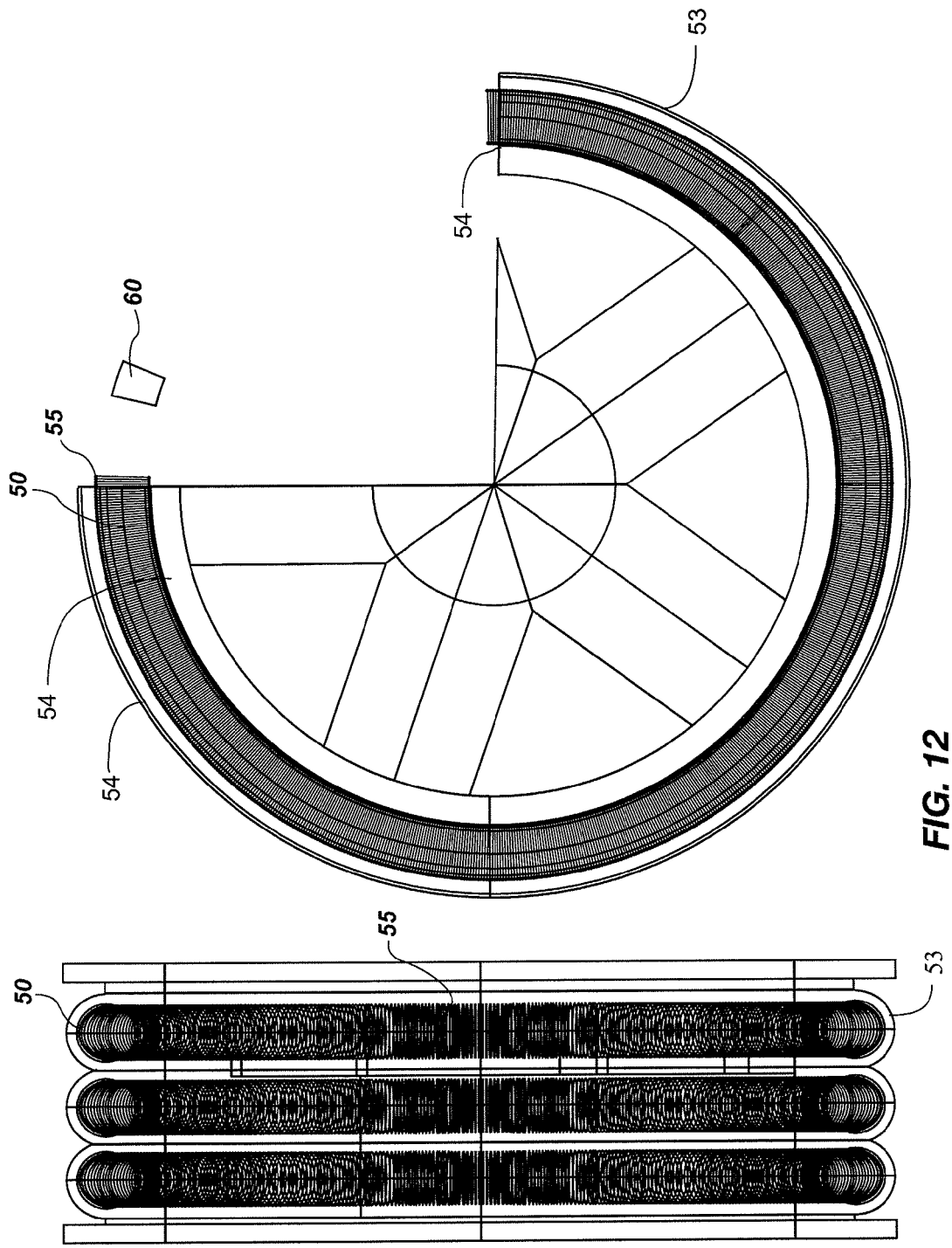
FIG. 12 is a side view of one embodiment of the present invention.

In one embodiment of the present invention, a plurality of hollow rings 55 are operatively coupled to one another. In one aspect, a plurality of hollow rings 55 having varying radii may be concentrically disposed about the same center point (FIG. 9). In yet another aspect, a plurality of hollow rings 55 having substantially equal radii are disposed adjacent one another about the same center point (FIG. 11).

In another embodiment of the present invention, an inner surface of the hollow ring 53 comprises a material having a coefficient of friction less than 0.1 (e.g., Teflon™). In another aspect, an inner surface of the hollow ring 53 comprises a material having a coefficient of friction less than 0.06. In yet another aspect, an outer surface of the magnet 60 comprises a material having a coefficient of friction less than 0.06. Advantageously, the material on the surfaces of the hollow ring 53 and/or the magnet 60 minimizes friction between the magnet 60 and the hollow ring 53 thereby promoting increased movement and efficient production of electrical energy. In an additional embodiment, an inner portion of the hollow ring 53 is vacuum sealed thereby minimizing friction between the magnet 60 and the hollow ring 53.

In an additional embodiment, the magnet 60 further comprises a plurality of wheels operatively coupled to the magnet 60. In yet another embodiment, the magnet 60 further comprises a plurality of ball bearings operatively coupled to the magnet 60. Advantageously, the wheels and/or the ball bearings decrease the friction between the magnet 60 and the hollow ring 53. In one aspect, the wheels and/or the ball bearings comprise a magnetic material.

Piezoelectric Tire Generator

In another embodiment of the present invention, an apparatus for generating power from the flexing of a tire 70 as it contacts the road, or other surface, is contemplated. While use of the invention is described for use in connection with a tire on the moving vehicle, any hollow object which is subject to compression against another surface is contemplated for use herein.

In a piezoelectric material, the positive and negative electrical charges are separated, but symmetrically distributed, so that the crystal overall is electrically neutral. Each of these sites forms an electric dipole and dipoles near each other tend to be aligned in regions called Weiss domains. The domains are usually randomly oriented, but can be aligned during poling (not the same as magnetic poling), a process by which a strong electric field is applied across the material, usually at elevated temperatures. When a mechanical stress is applied, this symmetry is disturbed, and the charge asymmetry generates a voltage across the material. For example, a one cm cube of quartz with 2 kN (500 lbf) of correctly applied force upon it, can produce a voltage of 12,500 V.

Figure 13:
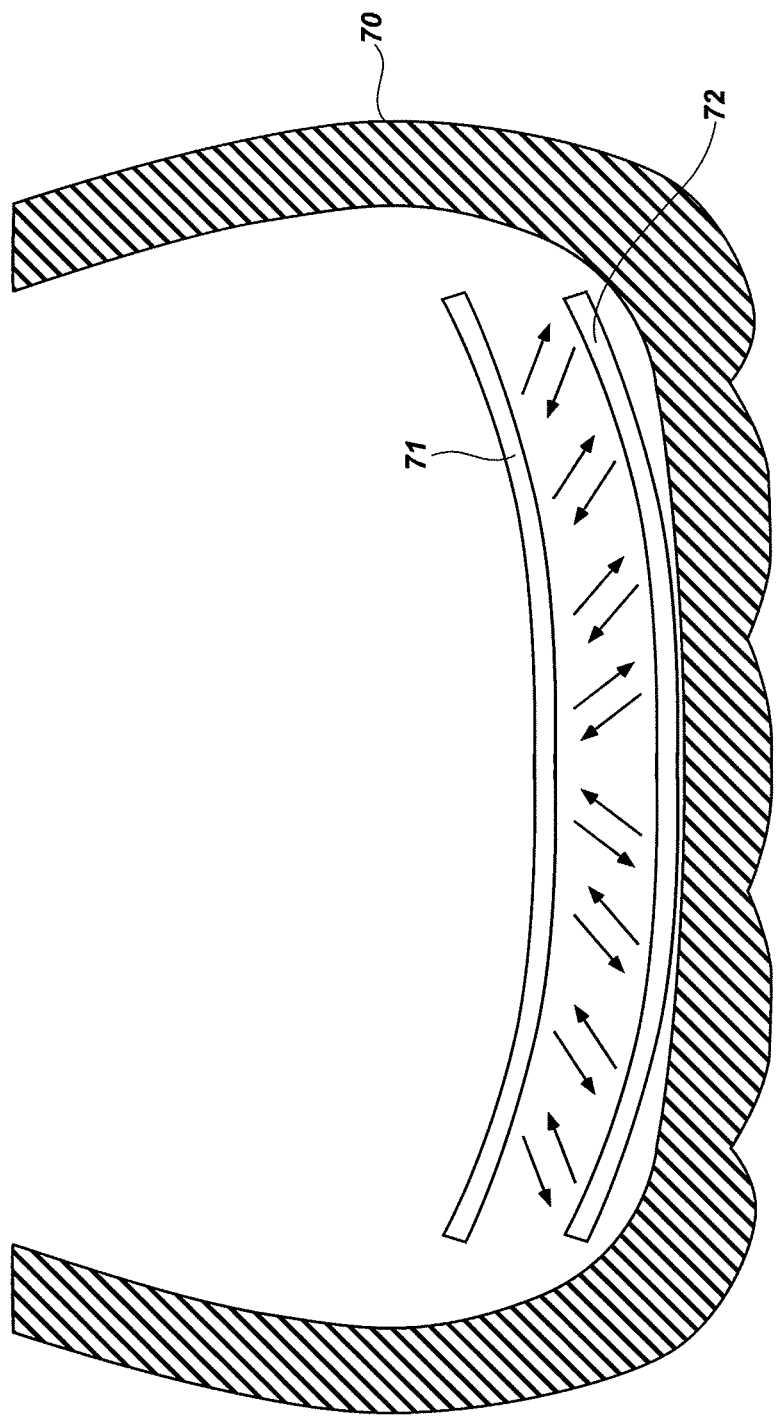
FIG. 13 is a cross section view of one embodiment of the present invention.

Referring now to FIG. 13, one or more layers of piezoelectric fabric 71, 72 are attached face to face within an inner liner or carcass area of the tire 70. In one aspect of the invention, the two layers of fabric 71, 72 are trimmed to cover the entire area of the tire 70 that will bulge from the contact with the road surface and flex or twist when the vehicle turns; either from front wheel or four wheel steering. As the tire 70 makes contact with the road surface, it bulges, depending upon inflation and the magnitude of the force put on the tire 70. When the tire 70 bulges, the two pieces of piezoelectric fabric 71, 72 flex, thereby exciting a low electric current. This current is fed from a main connector up through the wheel to an energy system controller 4 to power an electrolyzer 3 (see FIGS. 3 through 6).

In another embodiment of the present invention, at least one piezoelectric member (not shown) is disposed within an inner portion of a tire 70, wherein the piezoelectric member is configured to approximate the normally biased curvature of the tire 70. The piezoelectric member may be disposed on only a small portion of the tire 70 or may be configured to substantially cover an entire inner surface of the tire 70. In one aspect of the invention, a plurality of piezoelectric members configured to approximate the normally biased curvature of the tire 70 are disposed within the tire. In additional aspect, the piezoelectric material is integrally formed within the wall of the tire 70. In yet a further aspect, the piezoelectric material is used as the reinforcing members of the tire 70.

While any suitable piezoelectric material is contemplated for use herein, exemplary materials which may be used include quartz, topaz, tourmaline-group minerals, gallium orthophosphate ($GaPO_4$), langasite ($La_3Ga_5SiO_{14}$), barium titanate ($BaTiO_3$), lead titanate ($PbTiO_3$), lead zirconate titanate ($Pb[Zr_xTi_{1-x}]O_3 < x < 1$), potassium niobate ($KNbO_3$), lithium niobate ($LiNbO_3$), lithium tantalate ($LiTaO_3$), sodium tungstate ($Na_xWO_3$), and/or polyvinylidene fluoride (PVDF), and/or piezoelectric fiber composites (PFCs).

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A method for powering a mobile vehicle, comprising:
   separating a volume of water into hydrogen and oxygen components using an electrolyzer;

pressurizing the hydrogen and oxygen components and placing the hydrogen and oxygen components into separate tanks using the electrolyzer;
powering a combustion engine with the hydrogen and oxygen components without the use of atmospheric air, wherein the hydrogen and oxygen are exhausted from the combustion engine in the form of steam;
mobilizing the automobile with power generated from the engine;
converting motion from the mobile vehicle to electrical energy;
transmitting the electrical energy to an energy system control;
transmitting a portion of the electrical energy from the energy control system to the electrolyzer; and
utilizing energy generated by an inertial wheel generator to power the electrolyzer, the inertial wheel generator comprising:
a hollow ring disposed in a wheel;
a plurality of coil members disposed throughout the hollow ring; and
a magnet disposed within the hollow ring.

2. The method of claim 1, wherein the motion comprises at least one motion selected from the group consisting of inertia, friction, and aerodynamic motion.

3. The method of claim 1, further comprising converting heat from the engine into electrical energy.

4. The method of claim 3, wherein the heat comprises infrared heat.

5. The method of claim 1, further comprising converting passive energy into electrical energy by way of a device mounted on the mobile vehicle.

6. The method of claim 5, wherein the passive energy comprises at least one energy selected from the group consisting of wind and hydropower energy.

7. A closed-loop system for powering an automobile, comprising:
an electrolyzer configured to separate a volume of water into hydrogen and oxygen components and to pressurize the hydrogen and oxygen components for storage in separate tanks;
a combustion engine operatively coupled to the electrolyzer, the combustion engine configured to provide combustion without the use of atmospheric air, wherein said combustion engine is coupled with the electrolyzer in a closed loop and configured to deliver exhausted hydrogen and oxygen to the electrolyzer as water;
an energy system control operatively coupled to the electrolyzer;
an energy conversion apparatus operatively coupled to at least a portion of the automobile and configured to transmit energy to the energy system control; and
an inertial wheel generator configured to transmit energy to the energy system control, the inertial wheel generator comprising:
a hollow ring disposed in a wheel;
a plurality of coil members disposed throughout the hollow ring; and
a magnet disposed within the hollow ring.

8. The system of claim 7, wherein combustion fluids used in the combustion engine comprise hydrogen, oxygen, and water.

9. The system of claim 7, wherein the energy conversion apparatus comprises a deformable wheel having a void within the wheel and a piezoelectric material disposed within the void, wherein said material is adapted to deform and generate an electrical charge upon deformation of the wheel.

10. The system of claim 7, wherein the separate tanks comprise a plurality of higher pressure tanks for pressures ranging from 1,500 to 10,000 psi and a plurality of lower pressure tanks for pressures ranging from 100 to 1,500 psi.

11. A system for generating power, comprising:
an electrolyzer configured to separate a volume of water into hydrogen and oxygen components and to pressurize the hydrogen and oxygen components for storage in separate tanks;
a combustion engine operatively coupled to the electrolyzer, the combustion engine configured to provide combustion utilizing the hydrogen and oxygen and without the use of atmospheric air;
an energy system control operatively coupled to the electrolyzer;
a passive energy conversion apparatus operatively coupled to the energy system control;
means for utilizing heat generated by the engine combustion to heat the water within the electrolyzer; and
an inertial wheel generator configured to transmit energy to the energy system control, the inertial wheel generator comprising:
a hollow ring disposed in a wheel;
a plurality of coil members disposed throughout the hollow ring; and
a magnet disposed within the hollow ring.

12. The system of claim 11, wherein the passive energy conversion apparatus is configured to convert at least one energy selected from the group consisting of wind and hydropower energy.

13. The system of claim 11, wherein combustion fluids used in the combustion engine comprise hydrogen, oxygen, and water.

14. The system of claim 13, wherein water is injected into the combustion engine separate from the hydrogen and oxygen to cool the combustion engine and to reduce pre-ignition of the hydrogen and oxygen.

15. The system of claim 8, wherein water is injected into the combustion engine separate from the hydrogen and oxygen.

16. A closed-loop system for powering an automobile, comprising:
an electrolyzer configured to separate a volume of water into hydrogen and oxygen components and to pressurize the hydrogen and oxygen components for storage in separate tanks;
a combustion engine operatively coupled to the electrolyzer, the combustion engine configured to provide combustion without the use of atmospheric air, wherein said combustion engine is coupled with the electrolyzer in a closed loop and configured to deliver exhausted hydrogen and oxygen to the electrolyzer;
an energy system control operatively coupled to the electrolyzer; and
an inertial wheel generator configured to transmit energy to the energy system control, the inertial wheel generator comprising:
a hollow ring disposed in a wheel;
a plurality of coil members disposed throughout the hollow ring; and
a magnet disposed within the hollow ring.

* * * * *